United States Patent
Schuessler, Jr. et al.

[11] Patent Number: 6,035,885
[45] Date of Patent: *Mar. 14, 2000

[54] SEALING VALVE FOR CONTROLLING FLUID FLOW THROUGH A PASSAGE

[75] Inventors: Warren E. Schuessler, Jr., Florissant; Ray G. Buckles; Efim V. Sulpovar, both of St. Louis; Steven J. Nagel, Creve Coeur, all of Mo.

[73] Assignee: International Marketing, Inc., Chambersburg, Pa.

[*] Notice: This patent is subject to a terminal disclaimer.

[21] Appl. No.: 08/909,282

[22] Filed: Aug. 11, 1997

Related U.S. Application Data

[63] Continuation-in-part of application No. 08/762,502, Dec. 9, 1996, Pat. No. 5,803,108
[60] Provisional application No. 60/036,777, Jan. 28, 1997.

[51] Int. Cl.[7] .......................... F16K 43/00; F16K 51/00; B60C 29/04
[52] U.S. Cl. ..................... 137/315; 29/221.5; 137/223; 137/549; 141/38; 141/67; 141/100; 152/154.1; 152/427; 152/429; 210/429; 210/432
[58] Field of Search .............................. 137/15, 223, 231, 137/549, 550; 29/221.5, 221.6, 802, 890.123; 152/154.1, 427, 429, DIG. 5; 210/429, 432; 141/5, 9, 38, 67, 100

[56] References Cited

U.S. PATENT DOCUMENTS

| | | | |
|---|---|---|---|
| 732,871 | 7/1903 | Lemp | 137/329.04 |
| 832,038 | 10/1906 | Carlsson | 137/549 |
| 844,776 | 2/1907 | Carlson | 137/549 |
| 1,142,871 | 6/1915 | Bracken | 137/481 |
| 1,204,232 | 11/1916 | Anderson | 123/198 C |
| 1,403,056 | 1/1922 | Noble | 251/252 |
| 1,689,280 | 10/1928 | Fansler, Sr. | 137/480 |
| 1,799,998 | 4/1931 | Zwicky | 210/429 |
| 1,847,068 | 3/1932 | Campbell | 55/417 |
| 3,148,694 | 9/1964 | Casey et al. | 137/203 |
| 3,835,884 | 9/1974 | Ishikawa et al. | 137/550 |
| 4,991,617 | 2/1991 | Butler | 137/223 |
| 5,409,036 | 4/1995 | Ahmadian et al. | 137/549 |
| 5,522,910 | 6/1996 | Fogal, Sr. | 55/505 |

*Primary Examiner*—George L. Walton
*Attorney, Agent, or Firm*—Senniger, Powers, Leavitt & Roedel

[57] ABSTRACT

A sealing valve for controlling the flow of fluid through a passage defined by the interior surface of a tubular casing comprises a valve body having a longitudinal axis and a longitudinal bore therethrough. The valve body is formed for releasable connection to the tubular casing when the valve body is inserted longitudinally into the passage of the tubular casing. A valve seat is disposed on the valve body. A sealing assembly comprises a sealing device adapted for sealing engagement with the valve seat. The sealing device is movable with respect to the valve seat from a closed sealing position in which the sealing device sealingly engages the valve seat to block fluid flow through the bore in the valve body to an open position in which the sealing device is spaced from the valve seat to permit fluid flow through the bore. A filter element is disposed adjacent the inner end of the sealing valve and is configured for substantially preventing passage of particulate matter of a size capable of interfering with movement of the sealing device to its closed sealing position. The valve body, sealing assembly and filter element are so constructed that they are held in assembly with one another independent of the valve stem so that they can be simultaneously installed in and removed from the tubular casing passage as a single unit.

34 Claims, 15 Drawing Sheets

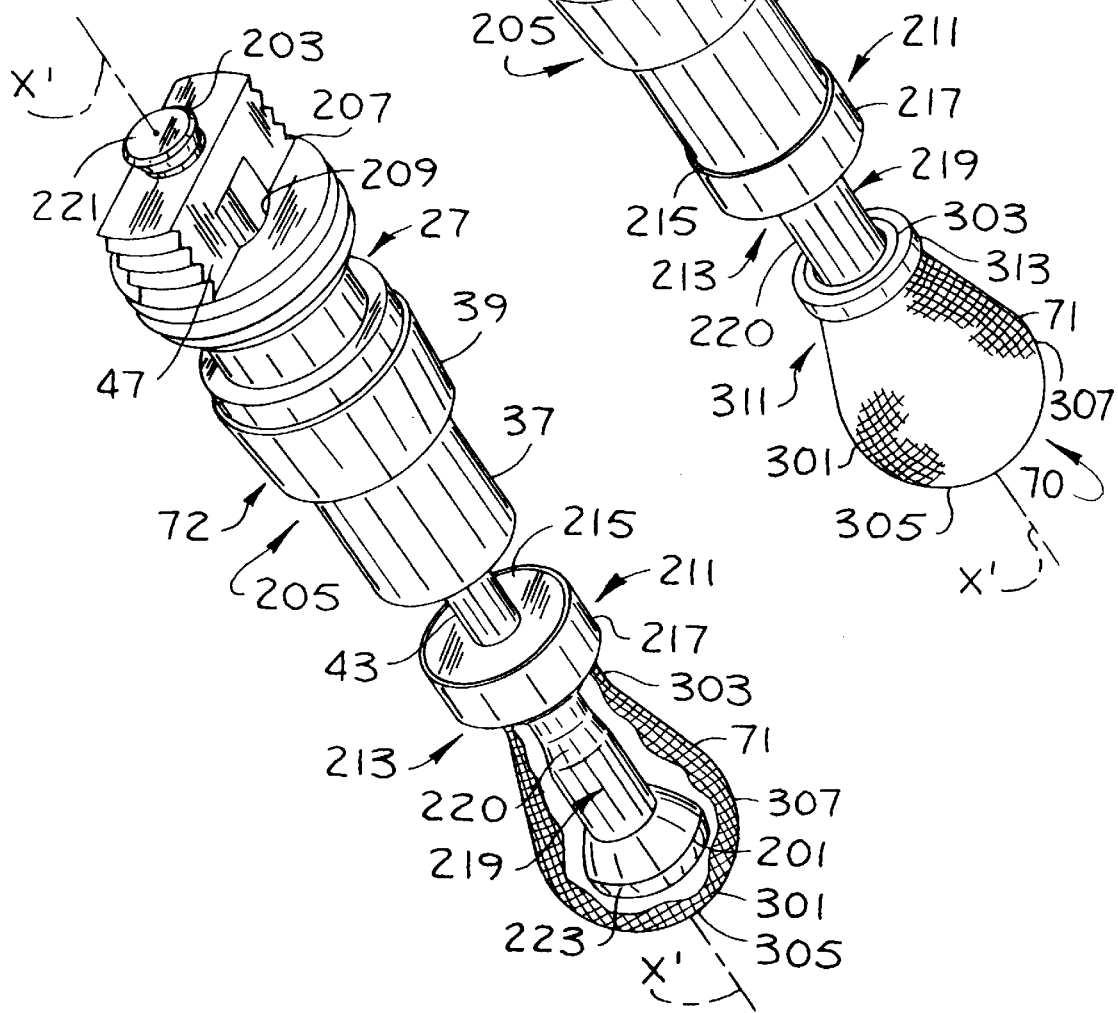

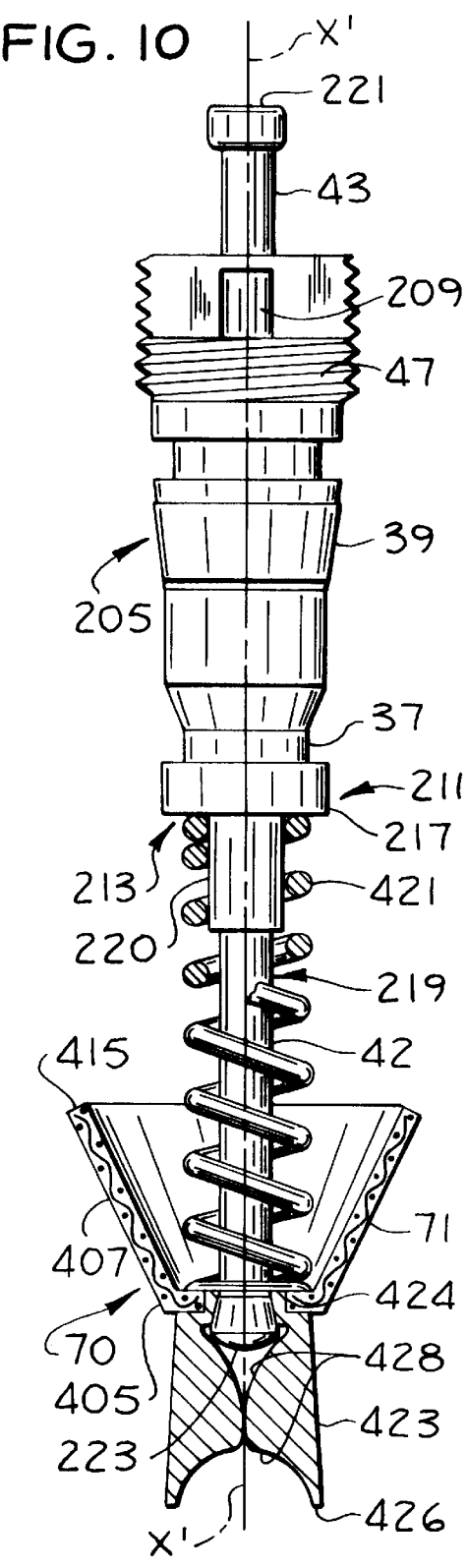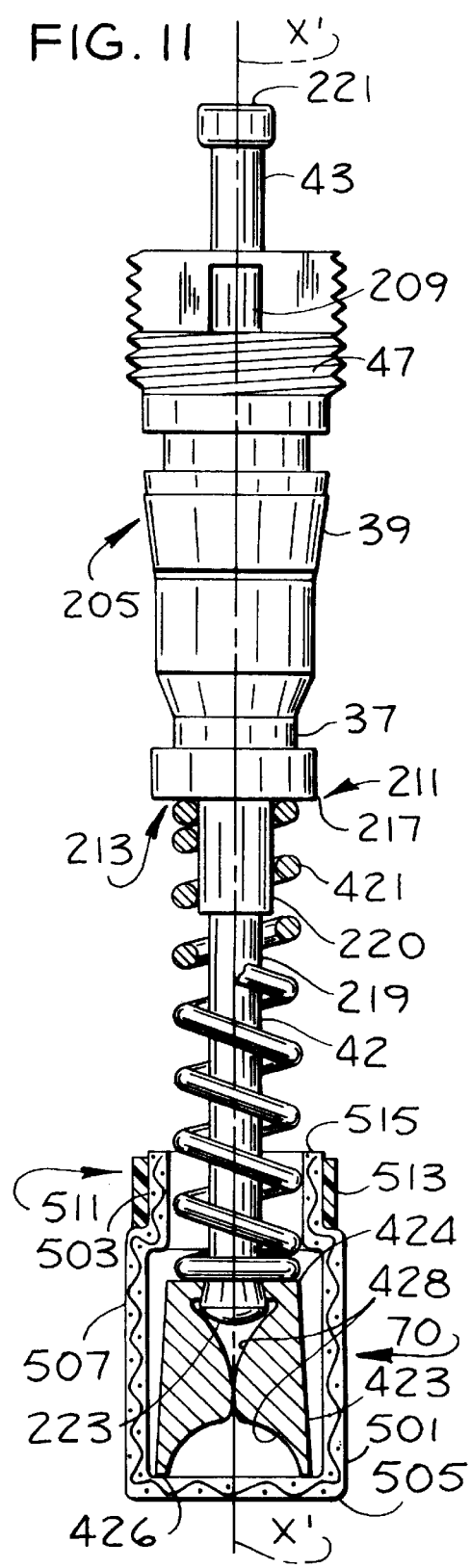

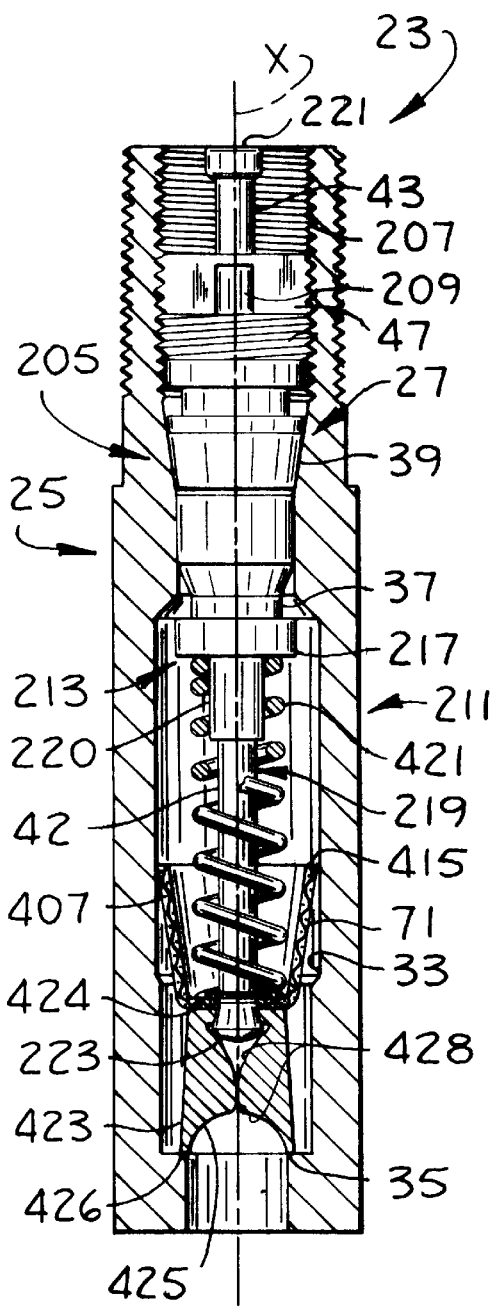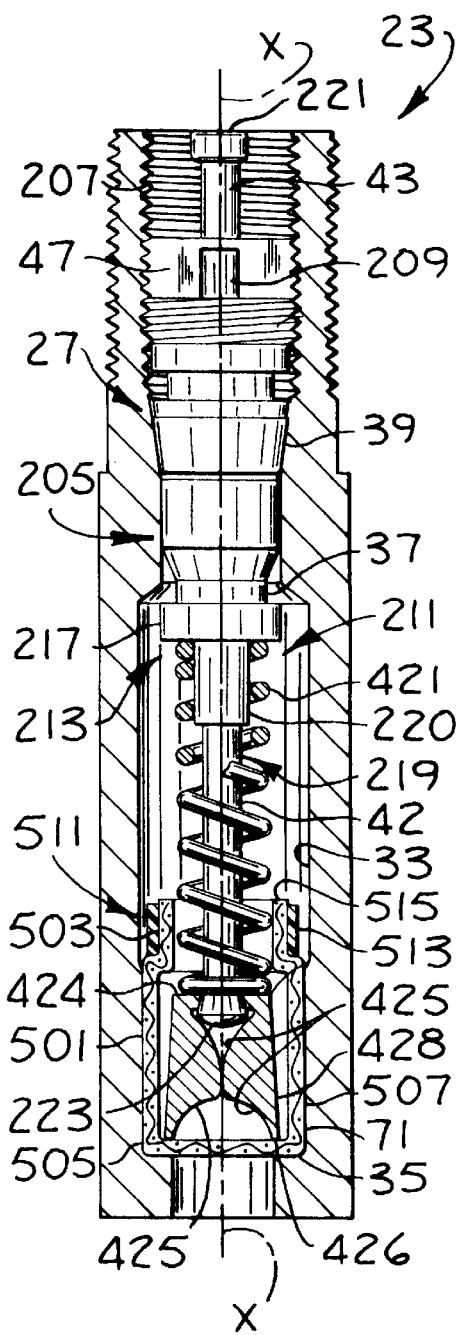

SEALING VALVE FOR CONTROLLING FLUID FLOW THROUGH A PASSAGE

CROSS REFERENCE TO RELATED APPLICATION

This application is a continuation-in-part of U.S. patent application Ser. No. 08/762,502, filed Dec. 9, 1996, now U.S. Pat. No. 5,803,108.

This application claims benefit of Provisional patent application No. 60/036,777, filed Jan. 28, 1997.

BACKGROUND OF THE INVENTION

This invention relates generally to sealing valves for controlling the flow of fluid through a passage defined by the interior surface of a tubular casing, and more particularly to sealing valves for inhibiting particulate material in the fluid from adversely affecting operation of the sealing valve.

Recent improvements in the methods of balancing a pneumatic wheel assembly and reducing the radial and lateral force variations within the wheel assembly under varying load conditions include the introduction of particulate or pulverulent material into a tire. One such method is disclosed in U.S. Pat. No. 5,073,217, which is incorporated herein by reference. The particulate material is mixed with pressurized fluid, such as air, and injected into the wheel assembly through the tire valve stem by a suitable injecting device, such as the device shown and described in U.S. Pat. Nos. 5,386,857 and 5,472,023, which are also incorporated herein by reference. One well-known particulate material is a polymeric synthetic plastic material sold by International Marketing, Inc. under the trademark "EQUAL".

The particulate material is injected into the tire of the wheel assembly with the valve core absent from the valve stem, such as in a new tire prior to installation of the valve core or in an older tire where the valve core has been removed from the valve stem, to allow free flow of the material into the tire. The tire is typically inflated or at least partially inflated during injection of the material into the tire. After injecting the material into the tire, the valve core is installed into the valve stem and the tire is inflated to the desired inflation pressure.

The valve core is a standard sealing valve used for controlling the flow of fluid through a passage defined by the interior surface of a tubular casing, such as the valve stem passage of the valve stem. A valve portion of the valve core opens and closes relative to a stationary valve seat in the passage to control fluid flow through the passage. It is important to the operation of the valve core that the valve and its associated valve seat remain free of particulate material. However, when the valve is opened to release pressurized fluid from the tire or to check the tire pressure, the above described particulate material may be drawn into the valve core and adversely affect operation of the valve core components, as by preventing the valve from fully closing against the valve seat, resulting in fluid continually leaking from the tire. It is also not uncommon for tires to contain other particulate matter such as dust, dirt, or particles of rubber which have dislodged from the interior bead of the tire during use of the wheel assembly. These particles may also be drawn into the valve core and adversely affect operation of the valve core components.

To reduce this risk, it is known to provide a valve stem having a movable filter element permanently enclosed within the valve stem between the valve core and the interior of the tire so that fluid is allowed to flow through the filter element while particulate material is retained within the tire and inhibited from reaching the valve core. For example, the valve stem shown and described in U.S. Pat. No. 5,479,975, which is incorporated herein by reference, includes such a filter. While this valve stem is quite useful, users of particulate material such as EQUAL may desire a method of removably installing a stationary filter into common or standard valve stems already used in the industry rather than replacing the valve stems with those having permanently installed filters.

In our co-pending U.S. patent application Ser. No. 08/762,502, which is incorporated herein by reference, we disclose a tool and method for inserting a filter element into the valve stem of a wheel assembly. The method includes installation of a filter element into the valve stem followed by installation of the valve core into the valve stem whereby the filter element inhibits particulate material in the interior of the tire from flowing to the valve core. However, the valve stem passage and associated valve core and filter element are relatively small, such as less than 0.20 inches in diameter. Because the filter element is separate from the valve core, there is risk of mishandling, dropping and losing the filter element, especially where the persons installing the filter element are wearing gloves, such as in a cold environment.

The use of valve cores or other similar sealing valves to control fluid flow through the passage of a casing is known in other industries as well. For example, valve cores are used to control fluid flow through utility lines, automotive, residential and commercial air conditioning units, carbonated beverage machines, and other apparatus in which it is necessary to control fluid flow through a tubular casing. It is equally important to the operation of valve cores used in these applications that the valve and its associated valve seat remain free of particulate material.

SUMMARY OF THE INVENTION

Among the several objects and features of the present invention may be noted the provision of a sealing valve, such as a valve core, having a filter element constructed for simultaneous installation in and removal from a passage of a tubular casing along with the valve core; the provision of such a sealing valve in which the filter element can be installed in or removed from the tubular casing passage without removing or replacing the tubular casing; the provision of such a sealing valve which reduces the risk of mishandling, dropping and losing the filter element; the provision of such a sealing valve which requires no additional structure in the passage for retaining the filter in the passage; the provision of such a sealing valve which is easy to install in the passage; the provision of such a sealing valve which is easy to assemble using standard, currently available sealing valves; and the provision of such a sealing valve which inhibits particulate material from flowing into the valve portion of the sealing valve.

In general, a sealing valve of the present invention for controlling the flow of fluid through a passage defined by the interior surface of a tubular casing comprises a valve body having a longitudinal axis and a longitudinal bore therethrough. The valve body is formed for releasable connection to the tubular casing when the valve body is inserted into the passage of the tubular casing to a position in which the longitudinal axis of the body is generally coaxial with the passage. A valve seat is disposed on the valve body. A sealing assembly comprises a sealing device adapted for sealing engagement with the valve seat. The sealing device is movable in an inward direction with respect to the valve seat from a closed sealing position in which the sealing device sealingly engages the valve seat to block fluid flow through the bore in the valve body to an open position in which the sealing device is spaced from the valve seat to permit fluid flow through the bore. A filter element is disposed adjacent the inner end of the sealing valve and is configured for substantially preventing passage of particulate matter of a size capable of interfering with movement of the sealing device to its closed sealing position. The valve body, sealing assembly and filter element are constructed to be held in assembly with one another independent of the tubular casing so that they can be simultaneously installed as a single unit in the tubular casing passage and simultaneously removed as a single unit from the tubular casing passage.

In another aspect of the present invention, a sealing valve of the present invention for controlling the flow of fluid through a passage in a tubular casing having an internal shoulder comprises a valve body having a longitudinal axis and a longitudinal bore therethrough. The valve body is formed for releasable connection to the tubular casing when the valve body is inserted into the passage of the tubular casing to a position in which the longitudinal axis of the body is generally coaxial with the passage. A valve seat is disposed on the valve body. A sealing assembly comprises a sealing device adapted for sealing engagement with the valve seat. The sealing device is movable in an inward direction with respect to the valve seat from a closed sealing position in which the sealing device sealingly engages the valve seat to block fluid flow through the bore in the valve body to an open position in which the sealing device is spaced from the valve seat to permit fluid flow through the bore. A filter assembly adjacent the inner end of the sealing valve is sized and configured for engaging the internal shoulder of the casing so that substantially all of the fluid flowing through the passage passes through the filter assembly. The filter assembly includes a filter element configured for substantially preventing passage of particulate matter of a size capable of interfering with movement of the sealing device to its closed sealing position. The valve body, sealing assembly and filter assembly are constructed to be held in assembly with one another independent of the tubular casing so that they can be simultaneously installed as a single unit in the tubular casing passage and simultaneously removed as a single unit from the tubular casing passage.

Other objects and features will become in part apparent and in part pointed out hereinafter.

BRIEF DESCRIPTION OF THE DRAWINGS

FIG. 6 is a perspective of a sealing valve of the present invention with a filter element attached thereto;

FIG. 7 is a perspective view of the sealing valve of FIG. 6 with a sealing device of the sealing valve moved to an open position, a portion of the filter element being removed to show an end of the sealing device;

FIG. 10 is a schematic of a second embodiment of a sealing valve of the present invention with a filter assembly attached thereto, the filter assembly being shown in section;

FIG. 11 is a schematic of a third embodiment of a sealing valve of the present invention with a filter assembly attached thereto, the filter assembly being shown in section;

FIG. 12 is a schematic of the sealing valve of FIG. 10 installed in a valve stem, with the filter assembly and valve stem shown in section;

FIG. 13 is a schematic of the sealing valve of FIG. 11 installed in a valve stem, with the filter assembly and valve stem shown in section;

Corresponding parts are designated by corresponding numerals throughout the several views of the drawings.

DESCRIPTION OF THE PREFERRED EMBODIMENT

Figure 1:
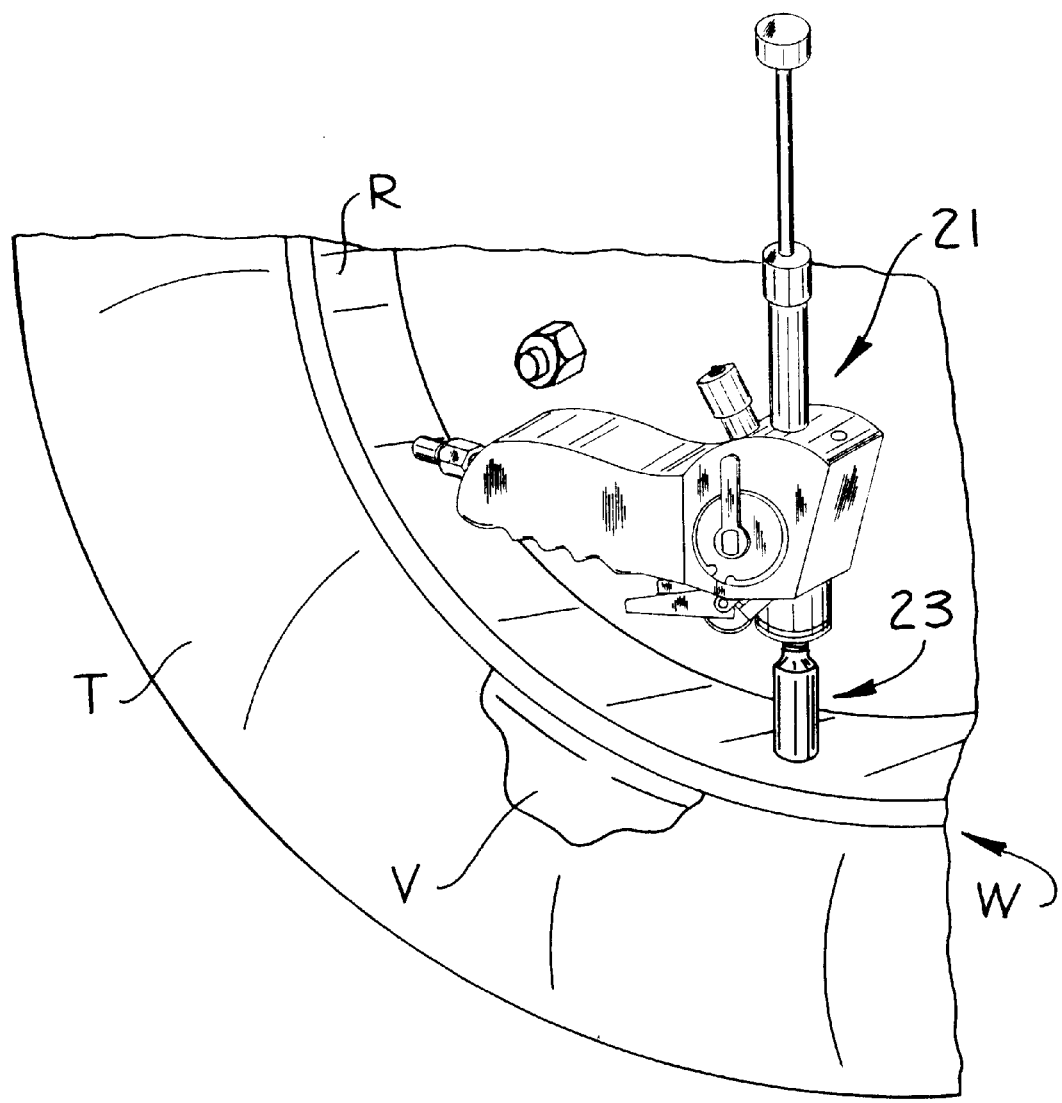
FIG. 1 is a perspective of a tool of the present invention connected to the valve stem of a wheel assembly.

Referring first to FIG. 1, a tool of the present invention for inserting a filter element into a valve assembly of a tire is indicated in its entirety by the reference numeral 21. This tool is fully shown and described in co-pending U.S. patent application Ser. No. 08/762,502, which is incorporated herein by reference. The tool 21 is shown connected to a pneumatic wheel assembly, indicated generally as W, which comprises a rim R and pneumatic tire T mounted on the rim. The rim R and tire T define an interior volume V within the wheel assembly W for holding pressurized fluid. A valve assembly, indicated generally as 23, is attached to the wheel assembly W in communication with the interior volume V for selectively allowing the flow of pressurized fluid in and out of the interior to inflate or deflate the tire T.

In the various drawings of the invention, the valve assembly 23 is oriented generally upright or vertical, and for the purpose of describing the invention as illustrated in the drawings the terms "upper" and "lower" are used in referring to the various components and operations of the valve assembly. However, it is to be understood that the valve assembly 23 may be oriented other than vertically and that the components and operations of the valve assembly may broadly be referred to using the terms "outer" and "inner", respectively.

Figure 5:
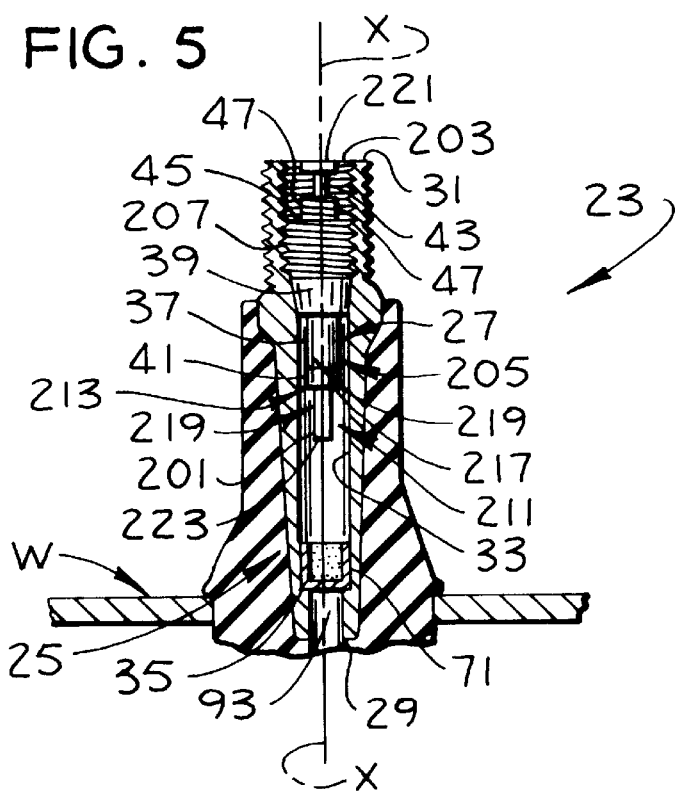
FIG. 5 is a cross sectional view of a valve assembly.

The valve assembly 23 (FIG. 5) comprises a valve stem, indicated generally as 25, and a sealing valve, such as valve core, indicated generally as 27, seated within the valve stem. The valve stem 25 is a substantially tubular casing having a first or lower end 29 adapted for attachment to the wheel assembly W in communication with the interior volume V, and a second or upper end 31 accessible from outside the wheel assembly. The ends 29, 31 of the valve stem 25 are open such that the interior surface of the stem defines a valve stem passage 33 in communication with the interior volume V of the tire to allow entry and exit of pressurized fluid into and out of the wheel assembly W. The valve stem passage has a central longitudinal axis X as shown in FIG. 5. The upper end 31 of the valve stem 25 is externally threaded for engagement by a closure cap (not shown) or other suitable connector, and is also internally threaded for engagement with the valve core 27 to secure the valve core within the stem.

The valve stem 25 has an internal annular shoulder adjacent its lower end defining a filter seat 35, the function of which is described further herein. However, valve stems not having this filter seat 35 are contemplated to be within the scope of this invention. Additionally, the present invention is not limited to any particular valve stem material, shape, size or method of attachment to the wheel assembly, and it is contemplated that the valve stem 25 may be configured for use with motorcycle tires, automobile tires, light and heavy duty truck tires, aircraft tires and other tires for which valve stems are commonly used, without departing from the scope of this invention.

Figure 14:
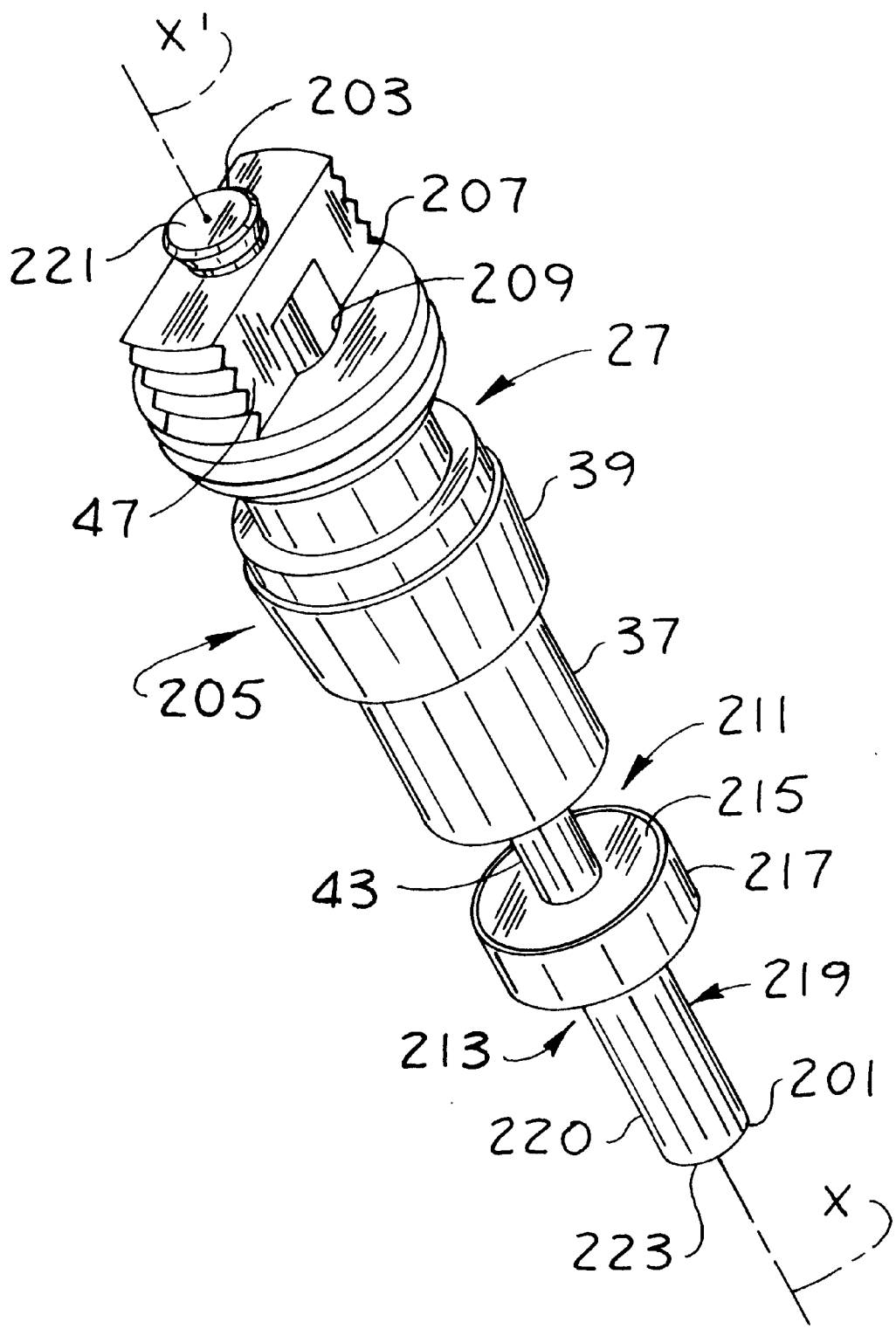
FIG. 14 is an enlarged perspective of a sealing valve of the valve assembly of FIG. 5.

With reference to FIG. 14, the sealing valve 27, or valve core, of the present invention has a lower end 201 and an upper end 203 and is adapted for being inserted, lower end first, in a downward direction into the valve stem passage 33. The valve core 27 comprises a stationary valve body, generally indicated at 205, having a longitudinal axis X'. The valve body 205 is threaded at an upper end 207 for releasable connection to the valve stem 25 so that the valve body 205 is held against longitudinal movement relative to the valve stem. The valve body 205 has a longitudinal bore 209 therethrough extending along its longitudinal axis X'. The valve body 205 is connected to the valve stem 25 in coaxial relationship with the valve stem passage 33 so that the longitudinal axis X' of the valve body is generally coincident with the central longitudinal axis X of the valve stem passage (FIG. 5).

A lower end of the valve body 205 surrounding the longitudinal bore 209 defines an annular valve seat 37 positioned in the valve stem passage 33 in coaxial relationship therewith. An annular sealing member 39 around the valve body 205 is engageable with the valve stem 25 so that fluid flowing within the valve stem passage 33 is directed through the longitudinal bore 209 in the valve body. The threaded upper end 207 of the valve body 205 is preferably rotatable with respect to the remainder of the valve body, and has an external surface formed with opposing flats 47 for reasons which will become apparent herein.

The valve core 27 also includes a sealing assembly, generally indicated at 211, adapted for longitudinal movement in the valve stem passage 33 relative to the valve body 205 for controlling the flow of fluid through the longitudinal bore 209 of the valve body. The sealing assembly 211 comprises a sealing device, indicated generally as 213, adapted for movement along the longitudinal axis X of the valve stem passage 33 between a closed sealing position in which the sealing device sealingly engages the valve seat 37 to block flow through the longitudinal bore 209 in the valve body 205, and an open position in which the sealing device is spaced from the valve seat to allow pressurized fluid to flow through the longitudinal bore, and an actuator pin, such as a valve pin 43, connected to the sealing device for use in moving the sealing device to its open position. A spring (not shown) disposed in the valve body 205 biases the sealing device 213 toward its closed sealing position.

Still referring to FIG. 14, the sealing device 213 comprises a sealing element 215, preferably constructed of rubber or other suitable material, seated in a generally cup-shaped sealing element carrier 217. A crimping member 220 is integrally formed with the sealing element carrier 217 and extends down from the carrier. The valve pin 43 extends up from the sealing device 213 through the longitudinal bore 209 in the valve body 205 beyond the threaded upper end 207 of the valve body. An upper end 221 of the valve pin 43 is accessible for being pushed downward relative to the valve body 205 and valve stem 25 against the bias of the spring for moving the sealing device 213 to its open position.

Figure 8:
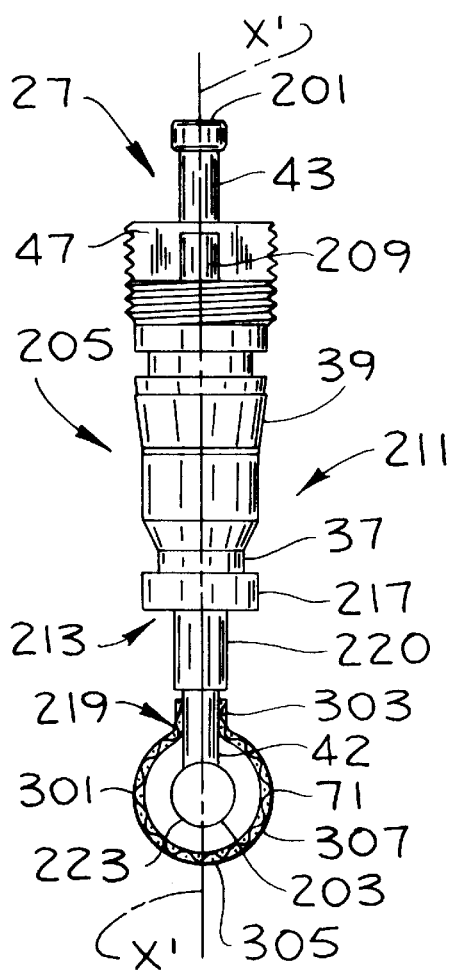
FIG. 8 is a schematic of a sealing valve similar to the sealing valve of FIG. 6 with the filter element shown in section.
Figure 9:
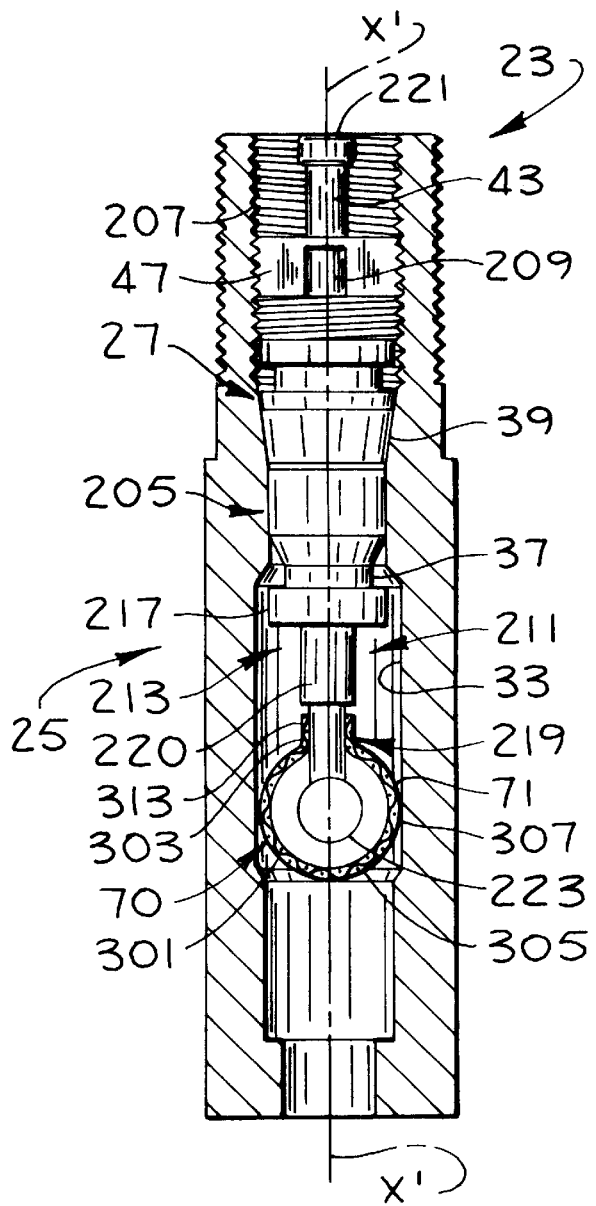
FIG. 9 is a schematic of the sealing valve of FIG. 8 installed in a valve stem, with the filter element and valve stem shown in section.

A lower portion 42 (not shown in FIG. 14 but shown extended beyond the crimping member 220 in FIG. 8) of the pin 43 extends down through the sealing element carrier 217 and crimping member 220, with the lower portion of the pin and the crimping member being generally co-terminal and together defining a shaft, generally indicated at 219, having a lower end 223. The crimping member 220 is preferably crimped by suitable crimping means (not shown) into secure engagement with the lower portion 42 of the valve pin 43 for connecting the sealing device 213 to the valve pin to define the sealing assembly 211. As shown in FIGS. 8 and 9, the lower portion 42 of the valve pin 43 may instead extend substantially down beyond the end of the crimping member 220 so that the shaft 219 extends further downward away from the carrier 217.

Figure 2:
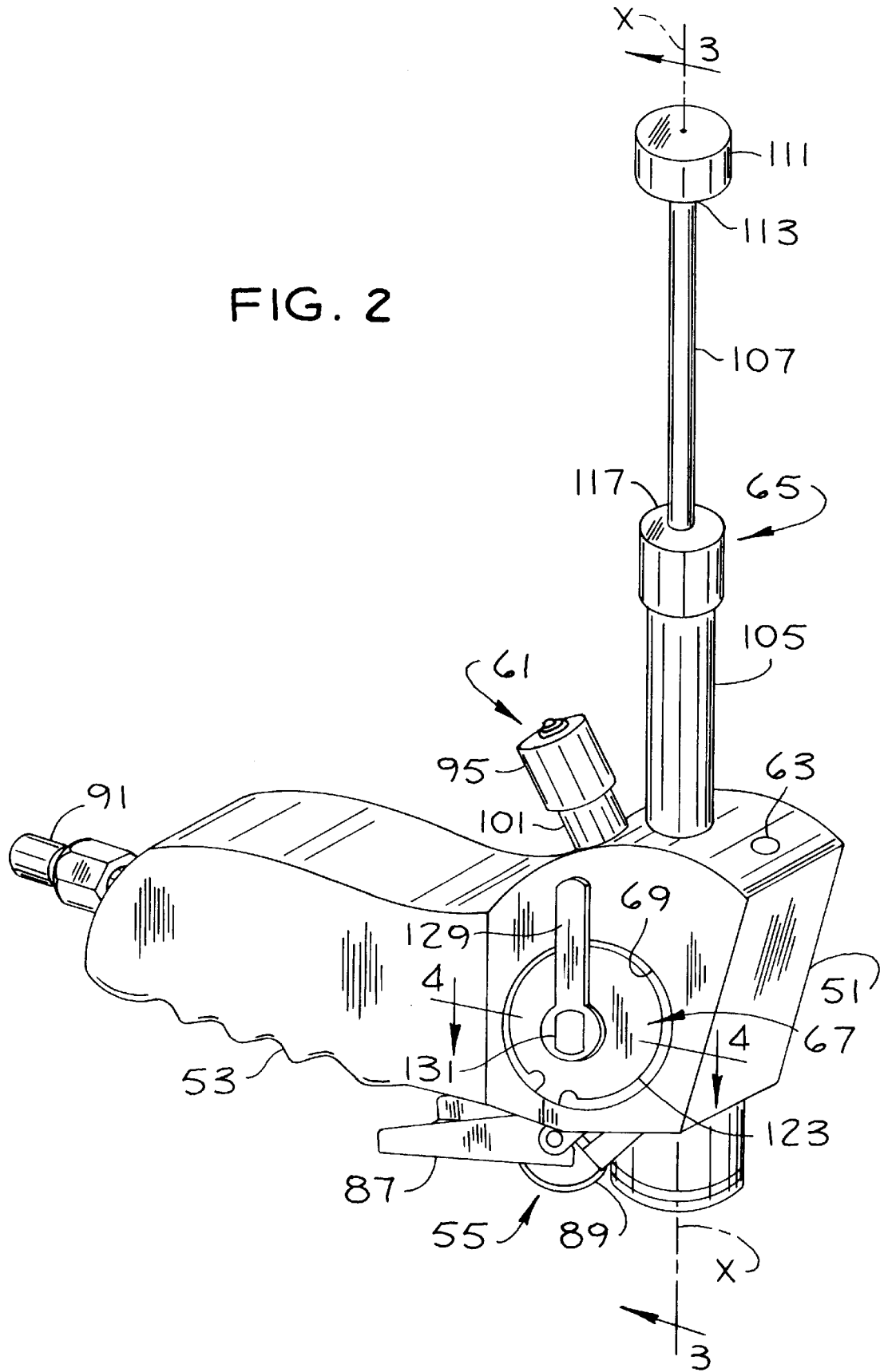
FIG. 2 is a perspective of the tool of FIG. 1.
Figure 3A:
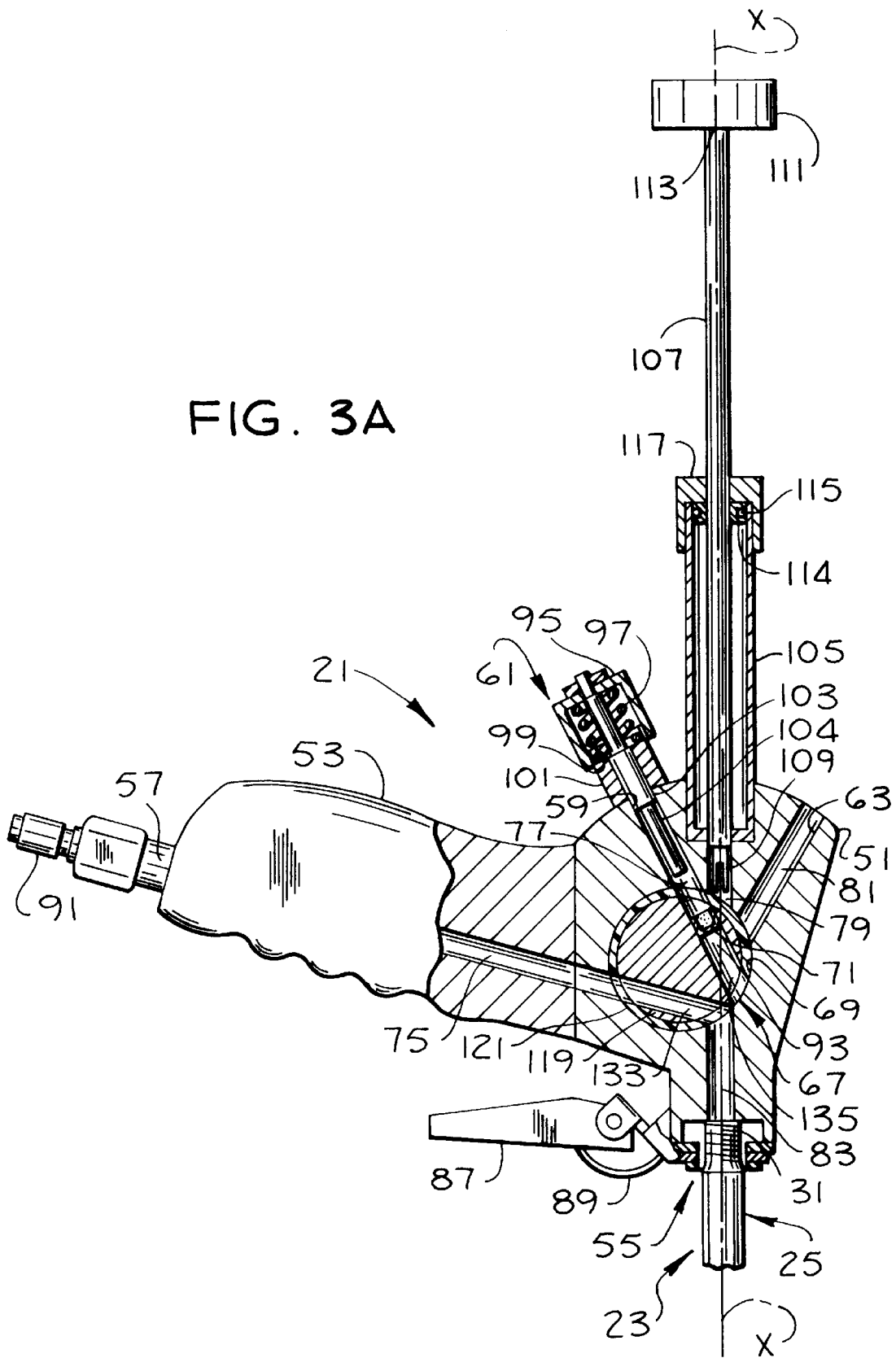
FIGS. 3A–D are fragmented cross sectional views taken along the line 3—3 of FIG. 2 at four different stages of operation of the tool.

With reference to FIGS. 2 and 3A, the tool 21 of the present invention generally comprises a body 51 having a handle 53, a valve stem connector, indicated generally as 55, a fluid inlet 57, a filter insertion inlet 59, a filter loading assembly, indicated generally as 61, a valve core insertion inlet 63, a plunger assembly, indicated generally as 65, and a selector valve, indicated generally as 67, rotatably mounted on the body for selectively configuring the tool to perform various operations while the tool is connected to the valve stem 25. For example, the tool 21 of the preferred embodiment is used for injecting particulate or pulverulent material into the interior volume V of the wheel assembly W, inserting a filter element 71 into the valve stem 25, and then installing the valve core 27 into the valve stem. The tool 21 shown in FIG. 2 is approximately 6.965 inches in length measured along the handle and body, 9.325 inches in depth measured along the valve stem connector and plunger assembly, and 1 inch in width. However, these dimensions may vary depending on the particular type of wheel assembly W and valve stem 25 for which the tool 21 is used.

The body 51 is preferably a unitary piece constructed of suitable material, such as plastic, brass, aluminum or steel, but it may be fabricated from multiple parts or other materials and be within the scope of this invention. The handle 53 extends outward from the body 51 to provide a means for grasping the tool 21 while connecting the tool to the valve stem 25 and performing the various operations. The handle 53 is preferably ergonomically configured to provide for comfortable grasping of the handle by the operator of the tool 21. The body 51 has a generally cylindrical opening 69 extending laterally therethrough for receiving the selector valve 67, the purpose of which will be described later. Various passages (FIGS. 3A–D), such as a fluid passage 75, a filter passage 77, a plunger passage 79, a valve core passage 81 and an outlet passage 83 (broadly an "outlet") extend outward from the opening 69 in the body 51 of the tool 21 to allow communication between the opening and the various components located about the periphery of the body and handle 53, as will be described.

The outlet passage 83 (FIGS. 3A–D) in the body is in direct alignment with a central longitudinal axis X of the valve stem passage 33 when the tool 21 is connected to the valve stem 25 to provide communication between the opening 69 in the body 51 and the valve stem passage. The valve stem connector 55 is preferably a quick disconnect coupler that allows for quick releasing engagement of the tool 21 with the valve stem 25. This connector 55 includes a trigger 87 pivotally connected to the tool 21 in spaced relationship with the handle 53 so that the trigger may be squeezed using the same hand that grasps the handle of the tool. A suitable spring clamp 89 is connected to the trigger 87 and is operable to engage the valve stem 25 releasably to connect the tool 21 to the stem. For example, squeezing the trigger 87 moves the spring clamp 89 away from the valve stem 25 to allow the connector 55 to be placed over the valve stem. Releasing the trigger 87 allows the spring clamp 89 to move under its own spring force into engagement with the valve stem 25 to releasably connect the tool 21 to the stem. Construction and operation of this type of connector is commonly known in the art, as disclosed in U.S. Pat. No. 4,276,898, and is described herein only for the purpose of providing a means for connecting the tool to the tire valve assembly. Other connecting means, such as those commonly know in the art for connecting gas or liquid supply lines, may be used without departing from the scope of this invention.

As best seen in FIGS. 3A–D, the fluid passage 75 extends through the body 51 and handle 53 to allow communication between the opening 69 in the body and the fluid inlet 57. A connector 91 is attached to the end of the handle 53 at the fluid inlet 57 for connection with a source of fluid. The fluid being defined herein as gas (such as air, nitrogen, or other suitable gases commonly uses for inflating the tire of a wheel assembly), liquid, or a mixture of gas or liquid under pressure and a particulate or pulverulent material. The particulate material is preferably a fine powder used for balancing the wheel assembly W and reducing the radial and lateral force variations within the wheel assembly under varying load conditions, such as the material described in U.S. Pat. No. 5,073,217, which is incorporated herein by reference. One such particulate material is a polymeric synthetic plastic material sold by International Marketing, Inc. under the trademark "EQUAL". The fluid source is preferably an injection device which mixes pressurized gas with the particulate material and injects the mixture into the interior volume V of the wheel assembly W, such as the injection device shown and described in U.S. Pat. Nos. 5,386,857 and 5,472,023, which are also incorporated herein by reference. It is understood, however, that the connector 91 may be connected to other fluid sources, whether or not particulate in nature, without departing from the scope of this invention.

The filter passage 77 provides communication between the opening 69 in the body 51 and the filter insertion inlet 59 and is sized for receiving the filter element 71. A tubular guide 101 extends outward from the body 51 in registry with the filter insertion inlet for properly guiding the filter element into the filter passage. The filter element 71 is preferably a screen woven of suitable material such as stainless steel, cloth or nylon, and has a mesh sized to prevent particulate material in the interior volume V of the wheel assembly W large enough to interfere with proper operation of the valve core 27 from passing into the valve stem passage 33, while causing little interruption in the rate of fluid flow through the valve stem passage. For example, the mesh size should preferably range from about 5 microns to 100 microns, and is more preferably about 40–50 microns. As shown in FIGS. 3A–D, the filter element 71 is generally cup-shaped (e.g., a hollow cylinder having a closed end 93), the closed end being in the path of fluid flowing through the valve stem passage 33. The diameter of the filter element 71 is slightly less than the diameter of the valve stem passage 33 so that the element seats tightly within the passage against the filter seat 35. Because of the small mesh size, the filter element 71 is sufficiently rigid or stiff to hold its shape upon insertion into the valve stem 25.

The filter element 71 is preferably pre-formed into its cup shape, but it may also be formed as it is inserted into the body 51 through the filter insertion inlet 59. Moreover, rather than using a screen-type element, the filter element 71 may be constructed of sintered materials, such as sintered stainless steel, sintered magnesium, sintered manganese and other sintered materials formed using known powdered metallurgical processes, or other porous media commonly used for filtering particulate material. The filter element 71 may also be spherical, disc shaped, or other suitable shapes without departing from the scope of this invention. It is also contemplated, as will be described later herein, that the filter element 71 may be affixed to the valve core 27 such as by bonding or other suitable means so that the combined filter element and valve core could be inserted into the filter insertion inlet 59 for delivery through the filter passage 77 toward the opening 69 in the body 51.

Still referring to FIGS. 3A–D, the filter loading assembly 61 is removable from the body 51 to allow loading of the filter element 71 into the filter passage 77 through the filter insertion inlet 59. The assembly 61 is then replaceable on the body 51 for pushing the filter element 71 toward the opening 69 in the body. The assembly 61 comprises a generally cylindric cap 95 having a closed top and an open bottom. A coil spring 97 in the cap 95 pushes against a seat 99 adjacent the open end of the cap adapted for contact with the tubular guide 101. The seat 99 and guide 101 are sized slightly smaller than the cap 95 to allow telescoping sliding movement of the cap relative to the seat and guide. The guide 101 acts as a reaction surface for the seat 99 for compressing the spring 97 as the cap 95 is pushed down over the seat and guide. A push rod or ram 103 is connected to the top of the cap 95 and extends through the seat 99 and guide 101 into the filter passage 77 in the body 51, with the ram being sufficiently long so that a free end 104 of the ram extends substantially into the opening 69 in the body when the spring 97 is compressed. The seat 99 is engageable with a shoulder on the ram 103 to hold the seat and spring 97 in assembly with the ram and within the cap 95.

In the preferred embodiment, the diameter of the free end 104 of the ram 103 is sized slightly smaller than the diameter of the filter element 71 so that the ram seats within the open end of the cup-shaped filter element for pushing the element toward the opening 69 in the body 51. It is contemplated that other suitable means for urging the filter element 71 through the passage 77 toward the opening 69 in the body 51 may be used without departing from the scope of this invention. The plunger passage 79 provides communication between the opening 69 in the body 51 and the plunger assembly 65, and is aligned with the central longitudinal axis X of the valve stem passage 33. As seen in FIGS. 3A–D, the plunger assembly 65 includes a guide tube 105 attached to the body 51 and extending outward from the body in alignment with the plunger passage 79, and a plunger 107 adapted for reciprocating movement in the guide tube 105 through a forward stroke in which a working end or head 109 of the plunger passes through the opening 69 in the body 51 through the outlet passage 83 into the valve stem passage 33, and a reverse stroke in which the head of the plunger is retracted into the plunger passage or entirely into the guide tube. The plunger 107 is preferably sufficiently long to extend into the valve stem passage 33 upon moving through its forward stroke. A cap 117 is mounted over the top of the guide tube 105 to secure the plunger 107 within the tube. It is understood that the plunger assembly 65 may be flexible, so that the plunger assembly need not be aligned with the central longitudinal axis X of the valve stem passage 33, without departing from the scope of this invention, as long as the head 109 of the plunger 107 is adapted for movement into the valve stem passage.

The head 109 of the plunger 107 is sized slightly smaller than the diameter of the filter element 71 for seating within the open end of the cup-shaped filter element to push the element into the valve stem passage 33. The head 109 is also preferably forked to fit over the flats 47 of the valve core insert 45. The plunger 107 is rotatable on its axis for screwing the valve core 27 into the valve stem 25. A disc-shaped knob 111 is mounted on the opposite (tail) end 113 of the plunger 107 for ease of handling and manipulating the plunger. An annular stop 114 is attached to the plunger 107 for movement within the guide tube 105. The stop 114 is sized larger than the openings in the guide tube 105 through which the plunger 107 extends so that the stop limits the forward stroke of the plunger into the valve stem passage 33, thereby limiting the depth of insertion of the filter element 71 into the passage. A suitable O-ring 115 seated in an annular groove in the stop 114 provides a seal between the stop and the guide tube 105 to prevent pressurized fluid from escaping the interior volume V of the wheel assembly W while the plunger 107 is in use, thereby maintaining the pressure within the wheel assembly.

While the plunger passage 79 is shown and described as extending toward the opening 69 in the body 51, it is contemplated that the plunger passage may extend through the body so that the plunger passage is in direct registry with the valve stem passage and that the filter passage may be in direct registry with the plunger passage so that a filter element received in the filter passage may be loaded directly into the plunger passage and pushed by the plunger through the plunger passage into the valve stem passage.

The valve core passage 81 provides communication between the opening 69 in the body 51 and the valve core insertion inlet 63 for delivery of a valve core 27 toward the opening. If necessary, the valve core 27 may be pushed toward the opening 69 using the filter loading assembly 61 described above. It is contemplated that the valve core 27 may be received in the filter passage 77 rather than a valve core passage 81 without departing from the scope of this invention.

Figure 3D:
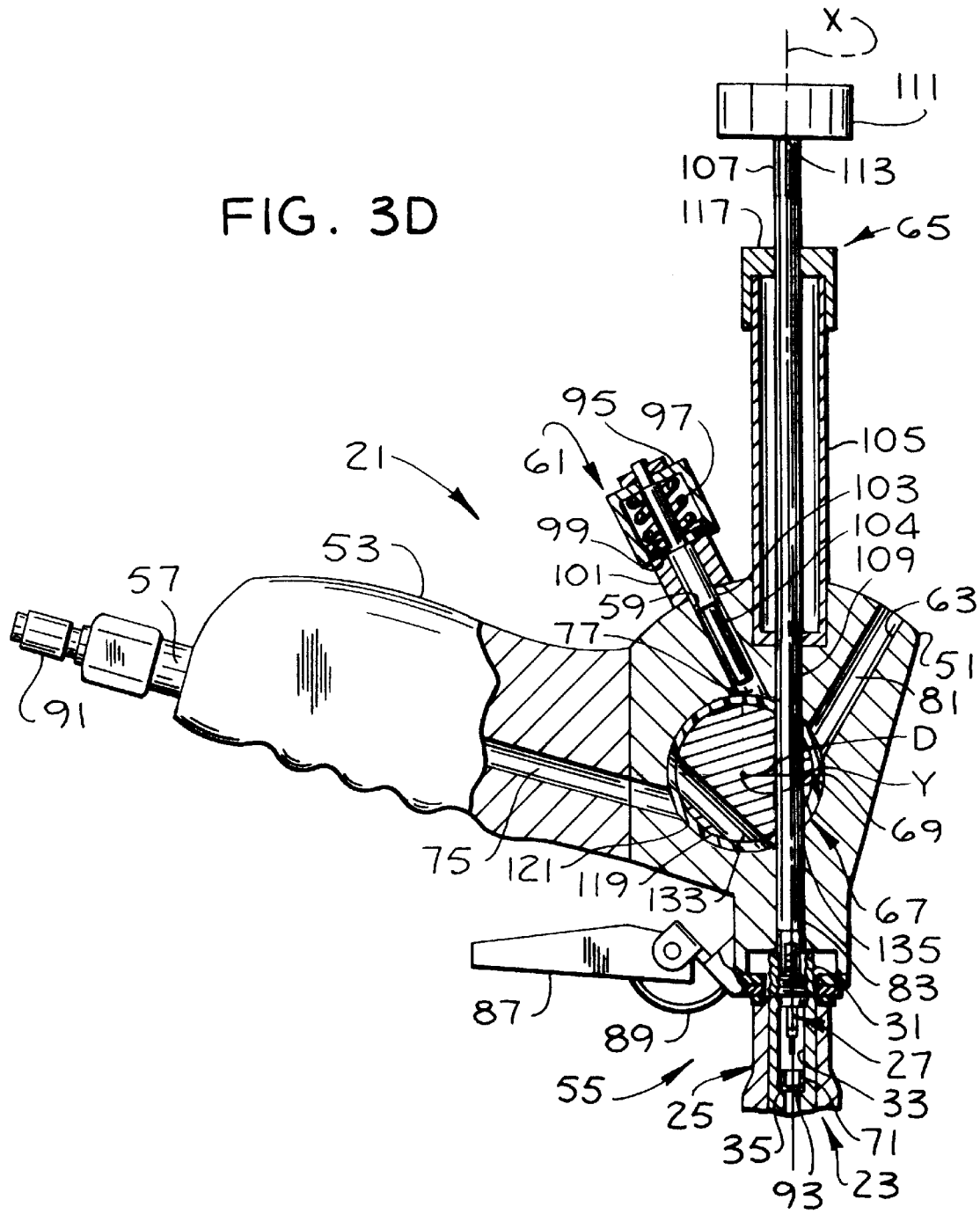
Figure 4:
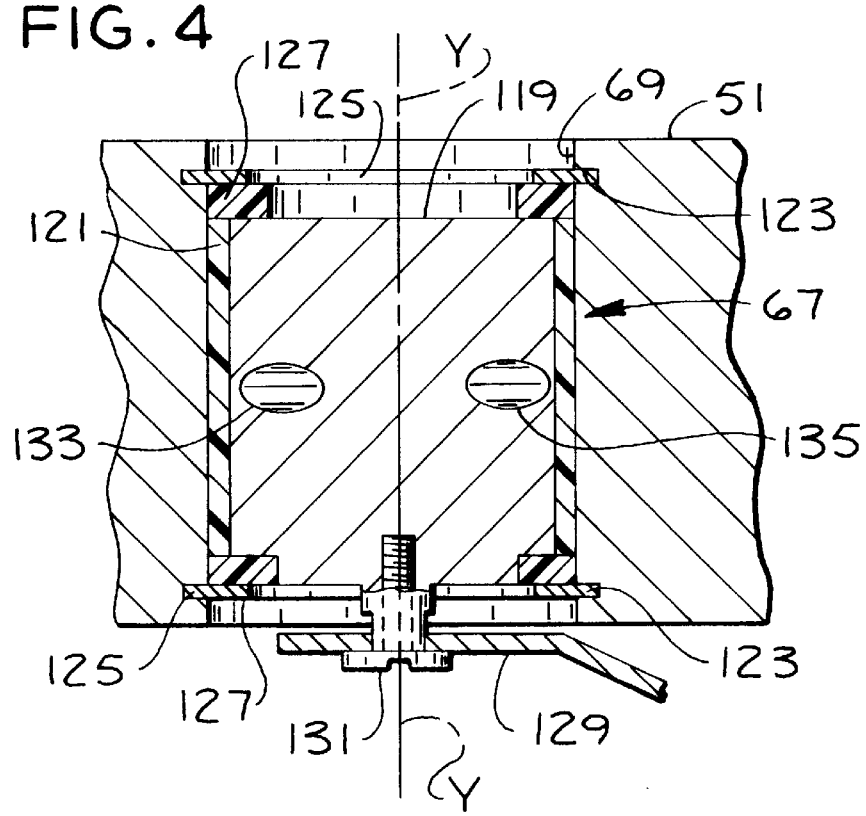
FIG. 4 is a fragmented cross sectional view taken along the line 4—4 of FIG. 2.

With reference to FIG. 4, the selector valve 67 (broadly, "moving means" or "means for moving the filter element 71 into registry with the plunger passage 79 and the valve stem passage 33") is rotatably mounted in the opening 69 in the body 51 for selectively performing the various operations of the tool 21. The selector valve 67 is generally cylindrical and is preferably of two-piece construction having a cylindrical core 119 constructed of brass or other suitable metal, and a sleeve 121 constructed of teflon or other suitable sealing, low-friction material surrounding the circumference of the core. The diameter of the selector valve 67 is slightly smaller than the diameter of the opening 69 in the body 51 so that the selector valve fits tightly in the opening. For example, the selector valve shown in FIG. 4 is about 1.25 inches in diameter. However, the diameter of the selector valve 67 may vary depending on the size of the tool 21 and the diameter of the opening 69 in the body 51. The teflon sleeve 121 seals the selector valve against the body while allowing rotation of the selector valve 67 relative to the body 51 about a rotational axis Y extending laterally with respect to the body. As shown in FIG. 3D, this axis Y is offset from the longitudinal axis X of the valve stem passage 33 by a distance D, although it is contemplated that the rotational axis of the selector valve 67 may intersect the longitudinal axis of the valve stem passage without departing from the scope of this invention.

The selector valve 67 is secured within the opening 69 in the body 51 by snap-rings 123 (FIG. 4) fitted into annular grooves 125 in the body 51 on each side of the selector valve. A non-metallic washer 127 is placed between each snap-ring 123, which is typically constructed of metal, and the selector valve 67 to prevent the core of the valve from rubbing against the snap-ring as the valve is rotated. It is understood, however, that means other than snap-rings 123 and washers 127 may be used for rotatably securing the selector valve 67 within the opening 69 in the body 51 without departing from the scope of this invention, as long as the valve is free to rotate relative to the opening about its rotational axis Y. Rotation of the selector valve 67 within the opening 69 in the body 51 between predetermined settings is affected by a lever 129 fitted over a stub shaft 131 extending outward from one side of the selector valve.

Two passages or bores 133, 135 extend through the selector valve 67 and are adapted for selective registry with the various passages 75, 77, 79, 81, 83 extending within the body 51 as the selector valve is rotated between its different settings (FIGS. 3A–D). The body 51 or the selector valve 67 may have stop limits (not shown) to assure proper positioning of the valve bores 133, 135 in registry with the passages 75, 77, 79, 81, 83. As shown in FIGS. 3A–D, the selector valve bores 133, 135 are completely separate from each other, there being no communication between the bores. The bores 133, 135 are also angled relative to one another and are directed along chords of the selector valve 67 so that neither bore extends through the rotational axis Y of the selector valve. For example, in the preferred embodiment these bores 133, 135 are angled approximately 45–50 degrees with respect to each other. However, the relative angle may vary according to the location of the various passages 75, 77, 79, 81, 83 within the body.

Operation of the tool 21 according to the method of the present invention will now be described with reference to FIGS. 3A–D. The pressure within the interior volume V of the wheel assembly W is adjusted such that the tire T, whether new or used, is partially inflated, as for example, to less than one-half of its rated pressure. As shown in FIG. 3A, the tool 21 is releasably connected to the valve stem 25 by grasping the handle 53 and squeezing the trigger 87 of the valve stem connector 55, placing the connector over the valve stem, and then releasing the trigger to allow the spring clamp 89 to move under its own spring force into releasable engagement with the valve stem to secure the tool on the stem. The plunger 107 is initially retracted so that the head 109 of the plunger is withdrawn into the guide tube 105 or plunger passage 79, and the selector valve 67 is positioned in a first setting in which the first bore 133 of the selector valve is in registry with the outlet passage 83 and the fluid passage 75 of the body 51 to provide communication between the valve stem passage 33 and the fluid source. A mixture of particulate material and pressurized gas is then injected into the fluid inlet 57 and directed through the fluid passage 75, the first bore 133 and the outlet passage 83 for injection through the valve stem passage 33 into the interior volume V of the wheel assembly W. After injection of the particulate material into the interior volume V, pressurized gas is delivered to the fluid inlet 57 and directed through the valve stem passage 33 into the interior volume V of the wheel assembly W to inflate the tire R to the desired pressure.

With the selector valve 67 still positioned in this first setting, the second bore 135 in the selector valve is in registry with the filter passage 77. The filter loading assembly 61 is removed from the body 51 and a filter element 71 is loaded into the passage through the filter insertion inlet 59. The assembly 61 is then replaced over the inlet 59 with the free end 104 of the ram 103 extending into the filter passage 77 and seating within the open end of the cup-shaped filter element 71. The cap 95 of the assembly 61 is pushed down over the guide 101 toward the body 51 whereby the ram 103 pushes the filter element 71 into the second bore 135 in the selector valve 67. Compression of the coil spring 97 caused by pushing the cap 95 down over the guide 101 biases the cap away from the body 51 so that when the cap is released, the ram 103 retracts out of the second bore 135. The other end of the second bore 135 is closed by the body 51 so that the filter element 71 is retained within this bore as shown in FIG. 3A until the selector valve 67 is rotated to another setting.

Figure 3B:
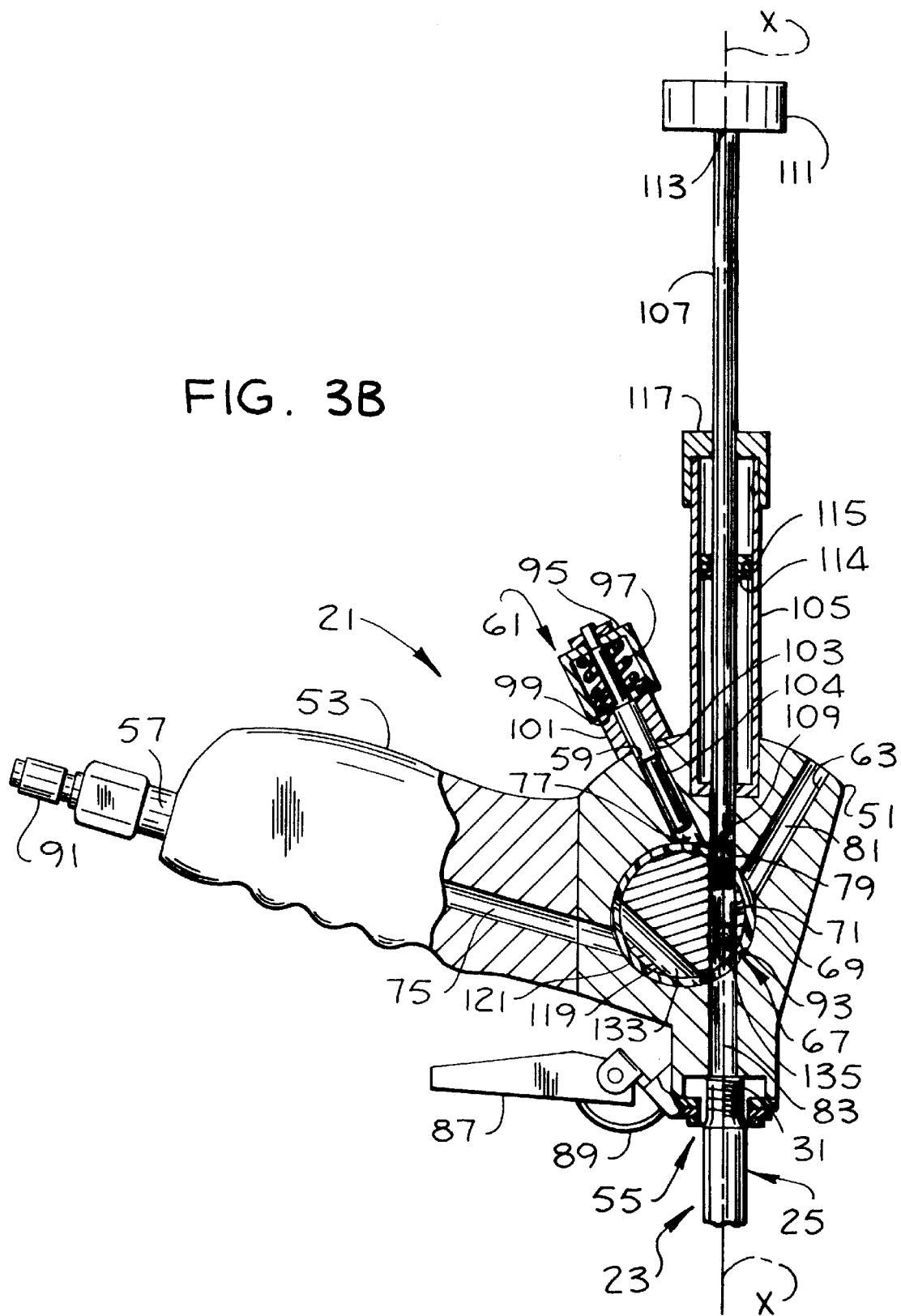

With the filter element 71 loaded in the second bore 135 in the selector valve 67, the lever 129 is then used to rotate the selector valve to a second setting, as best seen in FIG. 3B, in which the first bore 133 is no longer in registry with the fluid passage 75 and outlet passage 83 of the body 51, thus preventing the escape of gas from the interior volume V of the wheel assembly W through the fluid passage, and in which the second selector valve bore 135, in which the filter element 71 is loaded, is aligned with the central longitudinal axis X of the valve stem passage 33 in registry with the plunger passage 79 and the outlet passage 83. In this setting, the open end of the cup-shaped filter element 71 preferably faces the head 109 of the plunger 107. The plunger 107 is pushed forward in the guide tube 105 to move the head 109 of the plunger into the second bore 135 to seat within the open end of the cup-shaped filter element 71. Further forward movement of the plunger 107 pushes the filter element 71 through the aligned outlet passage 83 and into the valve stem passage 33 until the filter element seats against the filter seat 35 within the valve stem 25. The plunger 107 is then pulled back through a return stroke to move the head 109 of the plunger back into the plunger passage 79 (or into the guide tube 101). Where the valve stem 25 does not have a filter seat 35, it is contemplated that the top of the guide tube 105 will limit the forward stroke of the plunger 107 and hence limit the depth of insertion of the filter element 71 into the valve stem passage 33, whereby the tight fit of the filter element against the interior of the valve stem will act to secure the element within the valve stem passage.

Figure 3C:
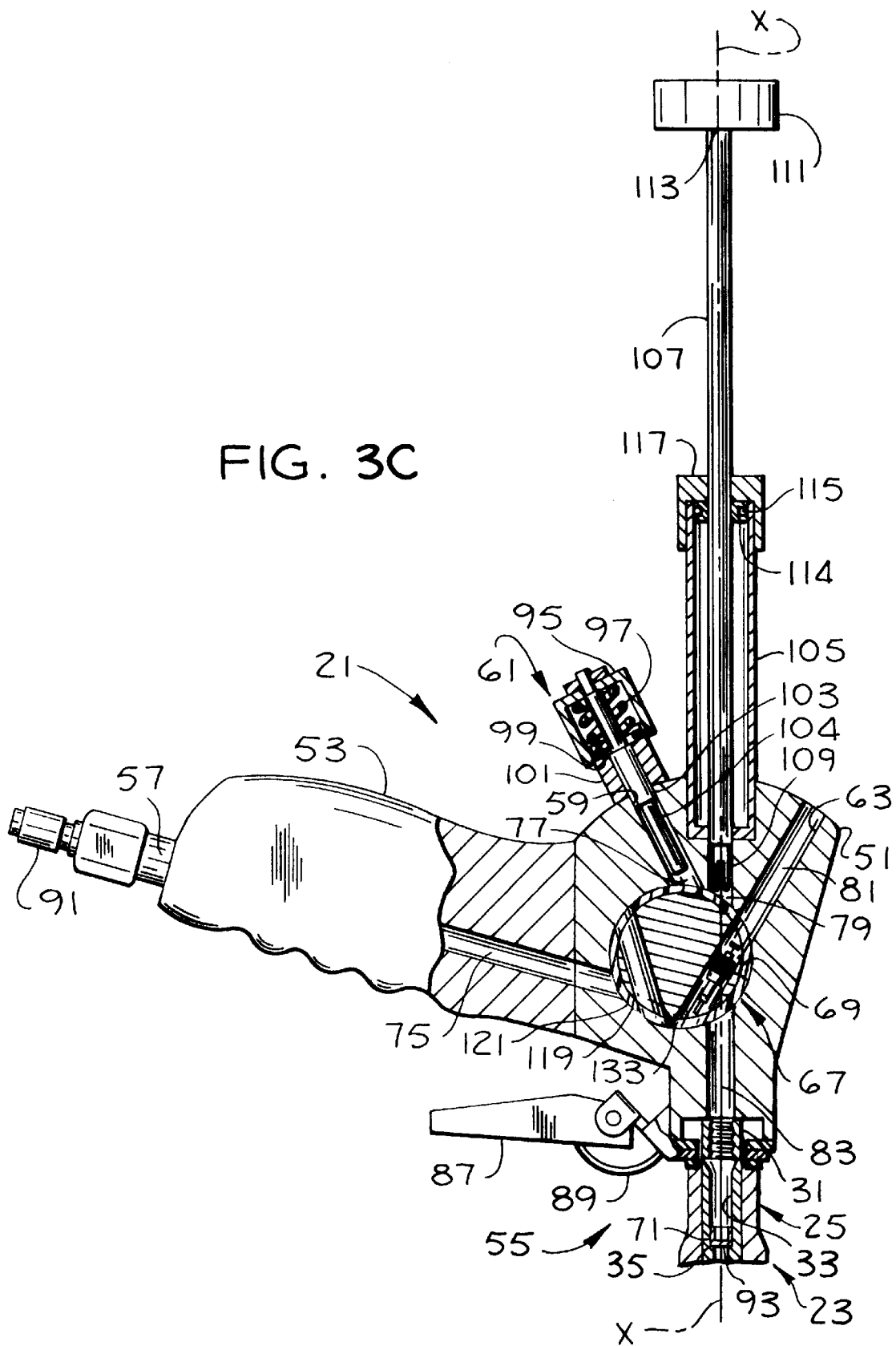

The next step is to rotate the selector valve 67, via the lever 129, to a third setting (FIG. 3C) in which the second bore 135 is in registry with the valve core passage 81. A valve core 27 is loaded into the valve core passage 81 through the valve core insertion inlet 63 and is pushed into the second bore 135 in the selector valve 67 as shown in FIG. 3C. If necessary, the filter loading assembly 61 may be used within the valve core passage 81 to push the valve core 27 into the second bore 135. The opposing end of the second bore 135 is closed by the body 51 so that the valve core 27 is retained within the second bore until the selector valve 67 is moved to a different setting.

Referring now to FIG. 3D, with the valve core 27 loaded in the second bore 135 of the selector valve 67, the lever 129 is used to rotate the valve back to its second setting to re-align the second bore in registry with the outlet passage 83 and plunger passage 79. The plunger 107 is then moved through its forward stroke to push the valve core 27 into the valve stem passage 33. The plunger 107 should be moved a distance sufficient to cause the forked head 109 of the plunger to fit over the flats 47 of the threaded insert 45 of the valve core 27, at which point the plunger 107 is rotated about its axis to screw the valve core into engagement with the internal threads of the upper end 31 of the valve stem 25 for securing the valve core within the valve stem passage 33. With the valve core 27 and filter element 71 installed in this manner, particulate material in the interior volume V of the wheel assembly W of a size capable of interfering with proper operation of the valve core is blocked by the filter element from flow through the valve stem passage 33 while other fluid under pressure is allowed to flow through the passage. The tool 21 is then disconnected from the valve stem 25 by again squeezing the trigger 87 of the valve stem connector 55 to move the spring clamp 89 out of engagement with the valve stem, and pulling the tool away from the stem.

While the tool 21 is described herein for manual operation, it is contemplated that the various operational components of the tool, including the lever 129 and the selector valve 67, the valve stem connector 55, the filter loading assembly 61 and plunger 107 may be automatically operated for increasing the rate at which filter elements can be inserted into wheel assemblies. Additionally, only the outlet passage 83 in the body 51 need be aligned along the central longitudinal axis X of the valve stem passage 33. The remaining passages 75, 77, 79, 81 and components may be located on the body 51 other than described herein without departing from the scope of this invention. Moreover, while the selector valve 67 is shown and described herein as rotating within the body 51 and having a rotational axis Y perpendicular to the body, numerous other selector valve embodiments are contemplated to be within the scope of this invention, such as a selector valve having a rotational axis in the plane of the body, as long as the valve is adapted for allowing fluid passage into the valve stem passage 33 when moved to a first position, and for preventing fluid passage in and out of the valve stem passage when moved to another position during operation of the other tool components.

Providing a filter passage 77 separate from the plunger passage 79 allows the filter element 71 to be installed into the valve stem passage 33 without disconnecting the tool 21 from the valve stem 25 and without removing the plunger 107 from its guide tube 105, thereby reducing the risk of losing the plunger, reducing the loss of pressure within the interior volume V of the wheel assembly W, and providing an efficient and reliable tool for inserting the filter element 71 into the valve stem passage 33. The mesh size of the filter element 71 is sized to inhibit particulate material from passing into the valve stem passage 33 and potentially adversely affecting operation of the valve core 27, thereby reducing the risk of gas leakage from the interior volume V of the wheel assembly W.

Additionally, the provision of the fluid passage 75, the valve core passage 81 and the selector valve 67 allow the user to selectively inject fluid under pressure into the interior volume V of the wheel assembly W, insert the filter element 71 into the valve stem passage 33, and install the valve core 27, all without disconnecting the tool from the valve stem, thus increasing the efficiency of the tool 21. This is particularly useful in the manufacture of new tires where the valve core 27 has not yet been installed.

As discussed above, it is contemplated that the filter element 71 may be attached to the valve core 27 so that the valve core and filter element can be installed in and removed from the valve stem passage 33 as a single unit. FIGS. 6–9 illustrate an embodiment of a valve core 27 with a filter element 71 attached thereto. The lower end 223 of the shaft 219 of the sealing device 213 is enlarged, preferably to have the shape of a frustum with a rounded bottom (FIG. 7), or a generally spherical shape (FIGS. 8 and 9), or other shapes such as a frustum with a flat bottom, a semi-spherical or domed shape, a cylindric shape, a disc shape or other suitable shape. The enlarged end 223 is secured to the shaft 219 by suitable fastening means, such as by crimping the enlarged end over the shaft into secure engagement therewith, although it is contemplated that the enlarged end may be integrally formed with the shaft. The maximum transverse diameter of the enlarged lower end 223 of the shaft 219 is substantially greater than the diameter of the shaft, but is also sufficiently less than the diameter of the valve stem passage 33 to allow free longitudinal movement of the enlarged end of the shaft within the passage along the central longitudinal axis X of the valve stem passage.

The filter element 71 is preferably a fine mesh screen constructed of a suitable material as described earlier. In this embodiment, the filter element 71 has the general shape of a balloon, having an enlarged, rounded body 301 and a narrowed neck 303. The filter element 71 is open at its neck 303 and is adapted for fitting onto the sealing device 213 over the enlarged end 223 of the shaft 219 so that the body 301 of the filter element surrounds the enlarged end of the shaft and the neck of the filter element encircles a portion of the shaft outward of the enlarged end of the shaft. The diameter of the neck 303 is preferably smaller than the maximum transverse diameter of the body 301 of the filter element 71, but larger than the diameter of the shaft 219. As seen best in FIG. 9, the enlarged body 301 of the filter element 71 has a side portion 307 adapted to engage the interior surface of the valve stem 25, and a filtering end portion 305 adapted to extend generally across the valve stem passage 33 below the side portion 307 of the filter element. When the body 301 of the filter element 71 is unrestrained, it has a maximum diameter greater than that of the valve stem passage 33 so that the side portion 307 of the filter element frictionally engages the interior surface of the valve stem 25 when the valve core 27 is installed in the passage. The filter element 71 is sufficiently flexible to substantially conform to the interior surface of the valve stem 25 as the filter element frictionally engages the interior surface of the stem.

Referring to FIG. 6, the filter element 71 is attached to the shaft 219 of the sealing device 213 by retention means, generally indicated as 311, that secures the neck 303 of the filter element in a position in which the diameter of the neck is substantially smaller than the maximum transverse diameter of the enlarged end 223 of the shaft 219. The retention means 311 is preferably a band 313 constructed of metal or plastic which encircles the neck 303 of the filter element 71 to hold the filter element on the shaft 219. The band 313 is adjustable to a diameter substantially less than the maximum transverse diameter of the enlarged end 223 of the shaft 219. Accordingly, the filter element 71 cannot slip off the enlarged end 223 of the shaft 219, so that the filter element is retained on the sealing device 213 to permit the valve body 205, sealing assembly 211 and filter element 71 to be simultaneously installed in the valve stem 25 and simultaneously removed from the valve stem. In the illustrated embodiment of FIGS. 6–9, the filter element 71 and the band 313 together broadly define a filter assembly, generally indicated at 70.

The band 313 of the filter assembly 70 is preferably adjusted only to a diameter at which the filter element 71 is loosely attached to the sealing device 213 rather than tightly clamped thereto. This permits longitudinal movement of the shaft 219 and its associated enlarged end 223 relative to the filter element 71 while the filter element is frictionally engaged with the interior surface of the valve stem 25. While the filter element 71 is generally flexible, it is also sufficiently rigid to remain in a fixed position relative to the valve stem 25 as the sealing device 213 moves between its open and closed positions. The enlarged body 301 of the filter element 71 is also sufficiently long to allow movement of the shaft 219 within the filter element so that when the sealing device 213 is moved to its open position, as shown in FIG. 7, the enlarged end 223 of the shaft 219 is adjacent the filtering end portion 305 of the filter element, and in the closed position, the enlarged end of the shaft is adjacent the neck 303 of the filter element. However, it is contemplated that the filter element 71 may be tightly clamped to the sealing device 213 for conjoint movement with the shaft in the passage 33, without departing from the scope of this invention.

While the filter element 71 shown in FIG. 6 is retained on the shaft 219 of the sealing device 213, it is understood that the filter element may be retained on the sealing element carrier 217 so that the entire shaft is enclosed by the filter element. Moreover, the filter element 71 may be retained on the valve body 205 so that both the sealing element carrier 217 and shaft 219 are movable within the filter element, without departing from the scope of this invention. It is also understood that means other than the band 313 may be used for retaining the filter element 71 on the sealing device 213, such as flexible cable (not shown) threaded through the mesh of the filter element adjacent its neck 303 and pulled taught to cinch the neck 303 of the filter element around the shaft 219, or by folding portions of the neck 303 of the filter element 71 over onto other portions of the neck and welding these portions together to permanently reduce the diameter of the neck. Moreover, the diameter of the neck 303 of the filter element 71 may initially be equal to the maximum transverse diameter of the body 301 of the filter element for ease of sliding the filter element over the enlarged end 223 of the shaft 219, without departing from the scope of this invention, as long as the filter element takes on the balloon shape when the diameter of the neck of the filter element is reduced and held in position by the retention means 311.

With reference to FIG. 9, the valve core 27 and attached filter element 71 are installed in the passage as a single unit by a suitable installation tool, such as the tool 21 described above. For example, in using this tool 21, the valve core 27, comprising the valve body 205, sealing assembly 211 and attached filter element 71, is loaded into the plunger passage 79, filter element first, as a single unit in the manner described above relating to installation of the valve core. As the valve core 27 is plunged down into the valve stem passage 33 by the plunger 107, the enlarged end 223 of the shaft 219 contacts the filtering end portion 305 of the enlarged body 301 of the filter element 71 to push the filter element down into the valve stem passage 33. The flexibility of the filter element 71 allows the side portion 307 of the enlarged body 301 of the filter element 71 to conform to the interior surface of the valve stem 33 in frictional engagement therewith so that substantially all fluid flowing through the valve stem passage 33 must pass through the filtering end portion 305 of the filter element 71. Once the valve core 27 is fully installed in the valve stem passage 33, the valve pin 43 is used to move the sealing device 213 between its open and closed sealing positions. The frictional engagement of the filter element 71 with the interior surface of the valve stem 25 maintains the filter element 71 in a fixed position in the passage 33 as the sealing device 213 is moved between its open and closed positions. The enlarged end 223 of the shaft 219 thus moves longitudinally within the stationary filter element 71.

To remove the filter element 71 from the valve stem passage 33, the valve body 205 is disconnected from the valve stem 25 and the valve core 27 is pulled upward relative to the passage. As the enlarged end 223 of the shaft 219 moves up out of the valve stem passage 33, it abuts the band 313 and neck 303 of the filter element 71, thereby pulling the band and filter element from the valve stem simultaneously with the valve body 205 and sealing assembly 211.

FIGS. 10 and 12 illustrate a second embodiment of a sealing valve 27 with attached filter element 71. A filter assembly, generally indicated at 70, comprises a spring seat 423 connected to the lower end 223 of the shaft 219 of the sealing device 213, and the filter element 71. As shown in FIG. 10, the spring seat 423 of the filter assembly 70 is generally cylindrical, having a generally closed upper end 424 and an open lower end 426 adapted for seating against the internal annular shoulder 35 of the valve stem 25. Notched portions 428 of the spring seat 423 facilitate fluid flow through the valve stem passage 25. The closed upper end 424 of the spring seat 423 has an opening through which the shaft 219 extends. The lower end 223 of the shaft 219 is enlarged to a size substantially greater than that of the opening so that the spring seat 423 cannot slide off of the lower end of the shaft, thereby retaining the filter assembly 70 on the shaft.

The filter element 71 is constructed to have the shape of a frustum, having a widened open end 415, a side portion 407 and a narrowed filtering end portion 405. The widened open end 415 of the filter element 71 preferably faces up toward the valve body 25 of the valve core 27. When the filter element 71 is unrestrained, the side portion 407 of the filter element has a maximum diameter greater than that of the valve stem passage 33 so that it frictionally engages the interior surface of the valve stem 25 when the valve core 27 is installed in the passage. The filtering end portion 405 of the filter element 71 includes that portion of the filter element below the side portion 407 that engages the interior surface of the valve stem 25, and is adapted to extend generally across the valve stem passage 33. The filter element 71 is sufficiently flexible to substantially conform to the interior surface of the valve stem 25 as the filter element frictionally engages the interior surface of the stem.

The filter element 71 is preferably formed initially from an annular mesh screen (not shown) cut along its radius to permit the filter element to be placed around the shaft 219 of the sealing device 213 generally on the upper end of the spring seat 423. The loose ends of the filter element 71 defined by the radial cut are overlapped slightly and soldered together so that the filter element cannot be removed from the shaft 219, thereby retaining the filter element on the sealing device 213. It is also contemplated that the filter element 71 may be pre-formed in its frustum shape with a central opening (not shown) formed therein so that the filter element may be fitted onto the shaft 219 before the spring seat 423 is connected to the shaft.

A spring 421 for biasing the sealing device 213 toward its closed sealing position is loosely retained on the shaft 219 of the sealing device between the sealing element carrier 217 and the upper end 424 of the spring seat 423, whereby the filter element 71 is secured to the sealing device by being clamped between the spring and the spring seat. The spring (not shown) disposed in the valve body 25 acts in conjunction with the spring 421 retained on the shaft 219 to further bias the sealing device 213 to its closed position, although the spring in the valve body may be omitted without departing from the scope of this invention. As shown in FIG. 12, the spring 421 also urges the spring seat 423 and filter element 71 downward in the valve stem passage when the sealing device is moved to its open position so that the spring seat remains stationary (along with the filter element) in abutment against the internal annular shoulder 35 of the valve stem 25. It is also contemplated that the filter element 71 may be retained on the shaft 219 between the sealing element carrier 217 and the spring 421, without departing from the scope of this invention.

With further reference to FIG. 12, the valve core 27 and attached filter element 71 are installed in the valve stem passage 33 as a single unit by a suitable installation tool, such as the tool 21 described above. For example, in using this tool 21, the valve core 27, comprising the valve body 205, sealing assembly 211 and filter assembly 70, is loaded into the plunger passage 79, filter assembly first, as a single unit in the manner described above relating to installation of the valve core. As the valve core 27 is plunged down into the valve stem passage 33 by the plunger 107, the filter element 71, which is retained between the spring seat 423 and the spring 421, is pushed down into the passage.

The flexibility of the filter element 71 allows the side portion 407 to substantially conform to the interior surface of the valve stem 25 in frictional engagement therewith so that substantially all fluid flowing through the passage must pass through the filtering end portion 405 of the filter element. The valve core 27 is plunged down into the valve stem passage 33 until the spring seat 423 engages the internal annular shoulder 35 of the valve stem 25 and the threaded upper end 207 of the valve body 205 engages the internal threads of the valve stem. Once the valve core 27 is fully installed in the valve stem passage 33, the valve pin 43 is used to move the sealing device 213 between its open and closed sealing positions.

As the sealing device 213 moves to its open position, the shaft 219 of the sealing device moves downward relative to the spring seat 423 and filter element 71. The sealing element carrier 217 compresses the spring 421 between the carrier and the spring seat 423 so that the bias of the spring urges the spring seat downward in the valve stem passage 33 to hold the spring seat in abutment with the internal annular shoulder 35 of the valve stem 25. The filter element 71 thus remains stationary as the sealing device 213 is moved to its open position, with the shaft 219 of the sealing device 213 moving longitudinally through the filtering end portion 405 of the stationary filter element 71 and the opening in the upper end 424 of the spring seat 423.

To remove the filter element 71 from the valve stem passage 33, the valve body 205 is disconnected from the valve stem 25 and the valve core 27 is pulled upward relative to the passage. The enlarged lower end 223 of the shaft 219 of the sealing device 213 abuts against the upper end 424 of the spring seat 423 to pull the spring seat and filter element 71 up out of the valve stem passage 33, thereby removing the filter element from the valve stem 25 simultaneously with the valve body 205 and sealing assembly 211.

FIGS. 11 and 13 illustrate a third embodiment of a sealing valve 27 of the present invention similar to the second embodiment. The filter element 71 of the filter assembly 70 is generally cup-shaped, having a generally cylindric side wall 507 or side portion, an open end 515 and a filtering end portion 505 defined by an end wall opposite the open end. The filter element 71 is adapted for fitting over the spring seat 423 so that a body 501 (comprising the side wall 507 and filtering end portion 505) of the filter element surrounds the spring seat 423 and a neck 503 of the filter element adjacent its open end 515 encircles a portion of the spring 421 retained on the shaft 219, above the spring seat. When installed in the valve stem passage 33, the filtering end portion 505 of the filter element 71 engages the internal annual shoulder 35 of the valve stem 25, and the filter element is held in a fixed position by the spring seat 423. The filtering end portion 505 is adapted to extend generally across the valve stem passage 33 so that substantially all fluid flowing through the passage passes through the filtering end portion of the filter element 71.

The filter assembly also includes retention means, generally indicated as 511, for attaching the filter element 71 to the shaft 219 of the sealing device 213. The retention means 511 secures the neck 503 of the filter element 71 in a position in which the diameter of the neck is smaller than the maximum diameter of the spring seat 423. In the illustrated embodiment, the retention means 511 is a band 513 constructed of metal or plastic which encircles the neck 503 of the filter element 71 to hold the filter element on the shaft 219. The band 513 is adjustable to a diameter substantially less than the maximum diameter of the spring seat 423. Accordingly, the filter element 71 cannot slip off over the spring seat 423, so that the filter element is retained on the sealing device 213 to permit the valve body 205, sealing assembly 211 and filter element 71 to be simultaneously installed in the valve stem 25 and simultaneously removed from the valve stem.

The band 513 is preferably adjusted only to a diameter at which the filter element 71 is loosely attached to the sealing device 213 rather than tightly clamped thereto. This permits longitudinal movement of the shaft 219 and spring 421 relative to the filter element 71 and spring seat 423 while the filter element is maintained in a stationary position in the valve stem passage 33 between the spring seat 423 and the internal annular shoulder 35 of the valve stem 25.

While the filter element 71 shown in FIG. 11 is retained on the shaft 219 of the sealing device 213, it is understood that the filter element may be retained on the valve body 205 so that both the sealing element carrier 217 and shaft 219 are movable within the filter element, without departing from the scope of this invention. It is also understood that means other than the band 513 may be used for retaining the filter element 71 on the sealing device 213, such as flexible cable (not shown) threaded through the mesh of the filter element adjacent its neck 503 and pulled taught to cinch the neck of the filter element around the spring 421, or by folding portions of the neck of the filter element over onto other portions of the neck and welding these portions together to permanently reduce the diameter of the neck.

With reference to FIG. 13, the sealing valve 27 of the third embodiment is installed in and removed from the valve stem passage 33 in a manner similar to the second embodiment. As the sealing valve 27 is plunged into the valve stem passage 33, the spring seat 423 pushes against the filtering end portion 505 of the filter element 71 to push the filter element into the passage until it engages the internal annular shoulder of the valve stem and the threaded upper end 207 of the valve body 205 engages the internal threads of the valve stem 25.

Figure 15:
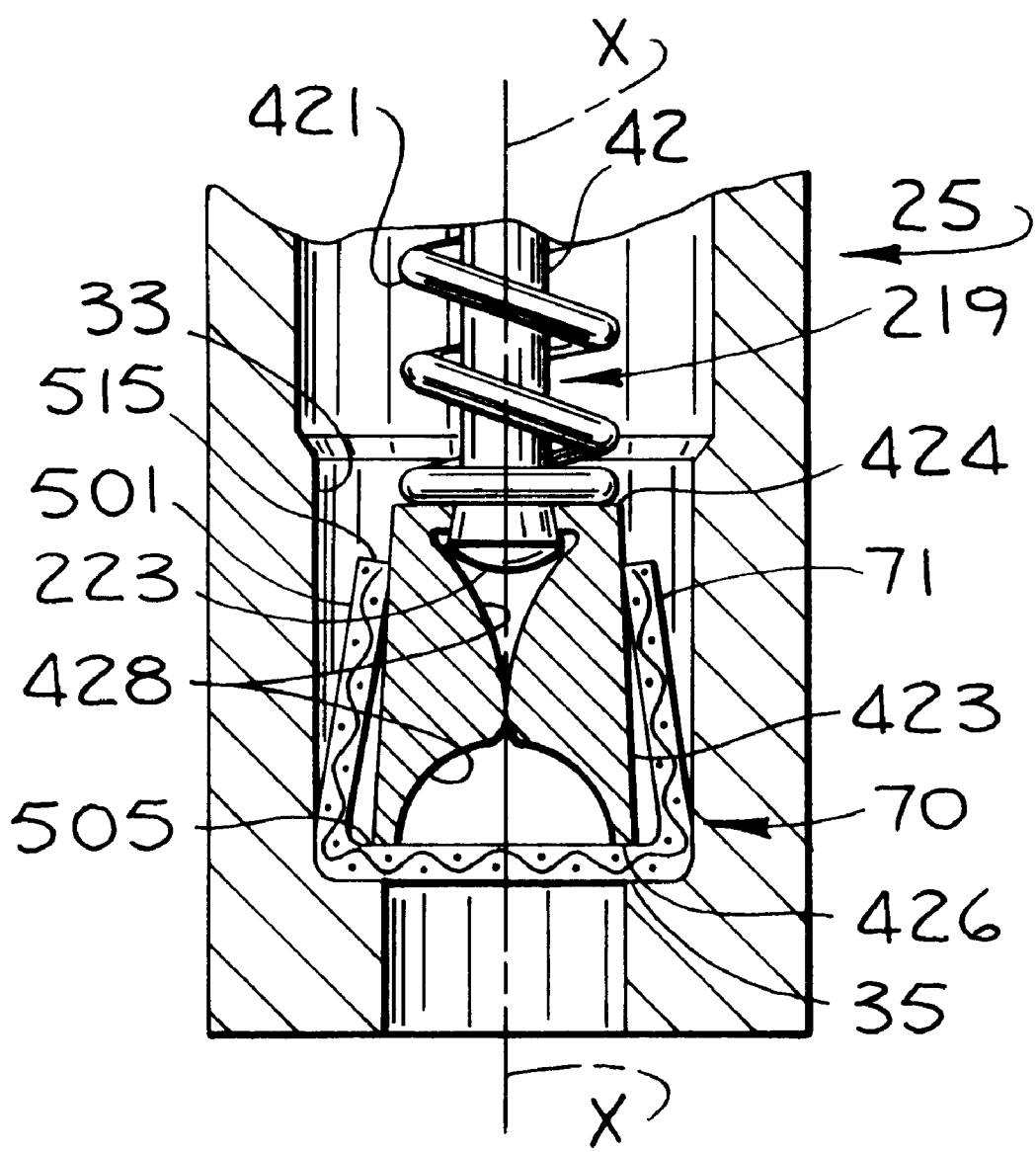
FIG. 15 is a fragmentary schematic showing a fourth embodiment of a sealing valve of the present invention, with a filter assembly and valve stem shown in section.

FIG. 15 illustrates a fourth embodiment of a sealing valve 27 of the present invention, substantially similar to the third embodiment, with the exception that the filter element 71 is attached directly to the spring seat 423 by welding or other suitable attachment methods.

Figure 17:
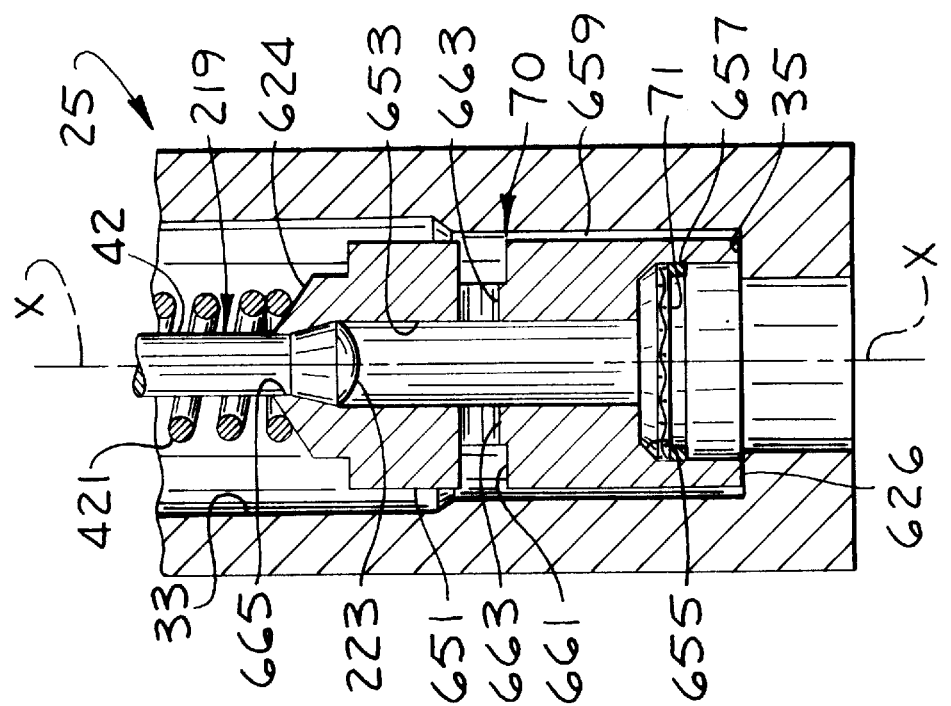
FIG. 17 is a fragmentary schematic of the sealing valve of FIG. 16 shown installed in a valve stem, the filter assembly and valve stem being shown in section.
Figure 16:
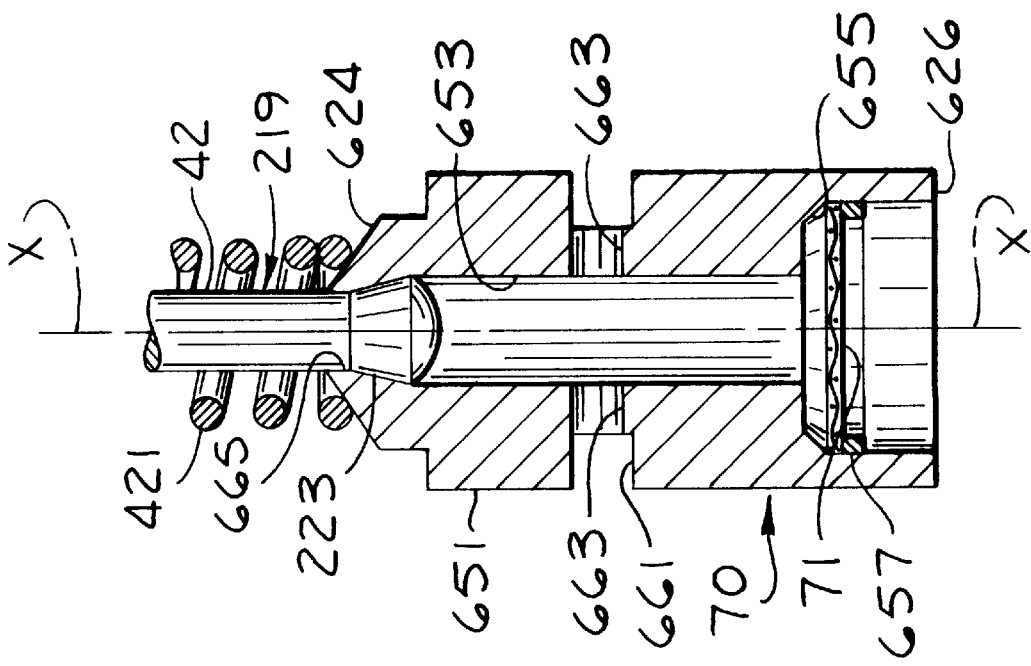
FIG. 16 is a fragmentary schematic showing a fifth embodiment of a sealing valve of the present invention with a filter assembly shown in section.

FIGS. 16 and 17 illustrate a fifth embodiment of a sealing valve 27 with attached filter element 71. The sealing valve 27, or valve core, of this fifth embodiment is similar to that of the second, third and fourth embodiments except that the filter assembly 70 comprises a filter housing 651 connected to the lower end 223 of the shaft 219 and a filter element 71 disposed in the housing. The filter housing 651 is generally cylindrical and has a passage 653 extending therethrough between an upper end 624 and lower end 626 of the housing. The lower end 626 of the filter housing 651 is sized for seating against the internal annular shoulder 35 of the valve stem 25 when the valve core 27 is installed in the valve stem passage 33 so that substantially all of the fluid flowing into and out of the tire T through the valve stem passage passes through the passage 653 in the filter housing. In the illustrated embodiment, the filter housing passage 653 is widened adjacent the lower end 626 of the housing 651 so that its diameter is slightly larger than the diameter of the valve stem passage 33 at the internal annular shoulder 35 of the valve stem 25. The filter housing passage 653 substantially narrows as it extends up toward the upper end 624 of the housing 651, thereby defining an internal annular shoulder 655 of the housing.

The filter element 71 is generally disc-shaped and sized for fitting into the widened portion of the housing passage 653 to seat generally against the internal annular shoulder 655 of the filter housing 651.

The filter element 71 frictionally engages the interior surface of the filter housing 651 to secure the filter element in the housing. A retaining ring 657 sized for frictional engagement with the interior surface of the filter housing 651 is inserted in the widened portion of the housing passage 653 to secure the filter element in the passage between the ring and the internal annular shoulder 655 of the housing. It is to be understood that the filter element 71 may be secured in the housing 651 by means other than the ring 657, such as by welding the element to the interior surface of the housing or other suitable means, without departing from the scope of this invention.

As shown in FIG. 17, the outer diameter of the filter housing 651 is substantially less than the diameter of the valve stem passage 33 so that an annular gap 659 is defined between the exterior surface of the filter housing and the interior surface of the valve stem 25. An exterior annular groove 661 extends around the filter housing and communicates with the gap 659. Openings 663 in the filter housing 651 extend transverse to the housing passage 653 and communicate with the exterior annular groove 661 to provide fluid communication between the filter housing passage and the annular gap 659 in the valve stem passage 33. The openings 663 are spaced substantially above the filter element 71 so that fluid flowing out from the tire T is filtered through the filter element before flowing out of the housing 651 and to the sealing device 213.

The filter housing passage 653 tapers radially inwardly and upwardly adjacent the upper end 624 of the housing 651 to define a reduced diameter opening 665 at The upper end of the housing. The shaft 219 extends through the opening 665 and into the filter housing passage 653. The lower end 223 of the shaft 219 is enlarged to a size substantially greater than that of the opening 665 at the upper end 624 of the housing 651 so that the housing cannot slide off of the lower end of the shaft, thereby connecting the housing to the shaft. However, the enlarged lower end 223 of the shaft 219 is sized smaller than the diameter of the filter housing passage 653 to permit the shaft to move longitudinally within the housing 651 as the sealing device 213 is moved between its open and closed positions.

The spring 421 on the shaft extends between the sealing element carrier 217 and the upper end 624 of the filter housing 651 to bias the filter housing toward the lower end 223 of the shaft 219 so that the housing remains stationary against the internal annular shoulder 35 of the valve stem during movement of the sealing device 213 between its open and closed sealing positions.

The spring 421 also biases the sealing device 213 to its closed position. In the illustrated embodiment, the spring 421 seats loosely against the filter housing 651 and carrier 217, but it is contemplated that the spring may be secured to the housing and/or to the sealing element carrier without departing from the scope of this invention. The spring disposed in the valve body 205 also biases the sealing device 213 to its closed position, although this spring may be omitted without departing from the scope of this invention.

With reference to FIG. 17, the valve core 27 and attached filter housing 651 and filter element 71 are installed in the valve stem passage 33 as a single unit by a suitable installation tool, such as the tool 21 described above. For example, in using this tool 21, the valve core 27, comprising the valve body 205, sealing assembly 211 and filter assembly 70, is loaded into the plunger passage 79, filter assembly first, as a single unit in the manner described above relating to installation of the valve core. The plunger 107 is used to push the valve core 27 into the valve stem passage 33 until the lower end 626 of the filter housing 651 engages the internal annular shoulder 35 of the valve stem 25 and the threaded upper end 207 of the valve body 205 engages the internal threads of the valve stem. Once the valve core 27 is fully installed in the valve stem passage 33, the valve pin 43 is used to move the sealing device 213 between its open and closed sealing positions.

When the sealing device 213 is moved to its open position, the shaft 219 of the sealing device moves downward in the valve stem passage 33 relative to the filter housing 651, with the lower end 223 of the shaft moving within the housing. The sealing element carrier 217 compresses the spring 421 between the carrier 217 and the upper end 624 of the housing 651 so that the bias of the spring urges the filter housing downward in the valve stem passage 33 to hold the housing stationary in abutment with the internal annular shoulder 35 of the valve stem 25. Fluid flowing out from the tire T flows into the filter housing passage 653 adjacent the lower end 626 of the housing 651 and is filtered through the filter element 71 disposed in the housing. The filtered fluid then flows up through the filter housing passage 653, out of the housing 651 through the openings 663 and into the valve stem passage 33 at the gap 659 between the filter housing and the interior surface of the valve stem 25. The fluid then exits the valve stem 25 in a conventional manner. Fluid flowing down through the valve stem flows along a reverse path, e.g., into the filter housing 651 via the openings 663, down through the housing passage 653 and filter element 71 and into the tire T.

To remove the filter assembly 70 from the valve stem passage 33, the valve body 205 is disconnected from the valve stem 25 and the valve core 27 is pulled upward relative to the passage. The enlarged lower end 223 of the shaft 219 of the sealing device 213 engages the upper end 624 of the filter housing 651 and pulls the housing and filter element 71 up out of the valve stem passage 33, thereby removing the filter element from the valve stem 25 simultaneously with the valve body 205 and sealing assembly 211.

Figure 18:
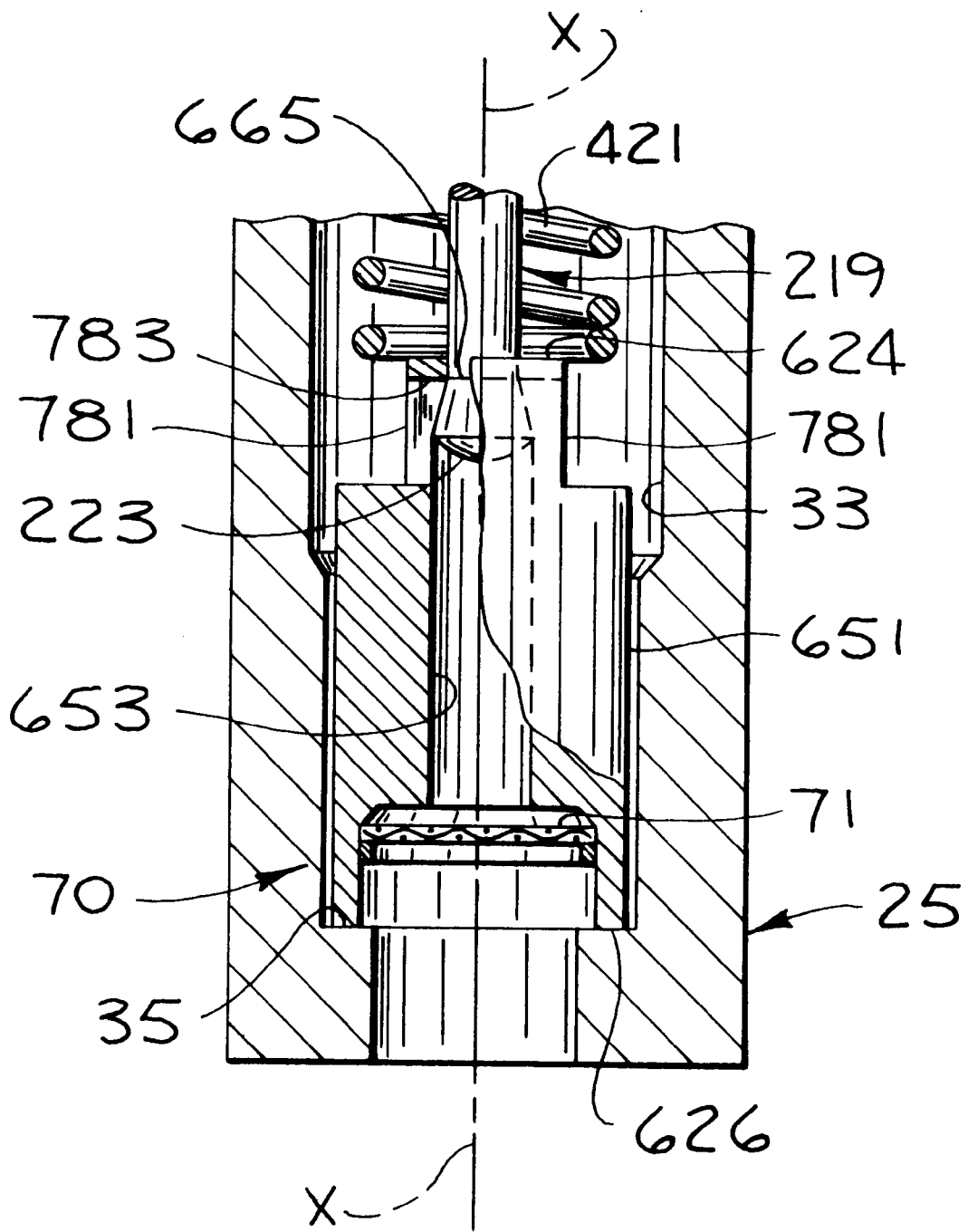
FIG. 18 is a fragmentary schematic showing a sixth embodiment of a sealing valve of the present invention with a filter assembly, the sealing valve being installed in a valve stem with the filter assembly and valve stem being shown in section.

FIG. 18 illustrates a sixth embodiment similar to the fifth embodiment in which the filter assembly 70 comprises the filter housing 651 and the filter element 71 disposed in the filter housing. In this sixth embodiment, the annular groove 661 and openings 663 (FIGS. 16 and 17) are omitted, eliminating the need for the gap 659 between the filter housing 651 and the interior surface of the valve stem 25. Thus, while the outer diameter of the filter housing 651 shown in FIG. 18 is less than the diameter of the valve stem passage 33, the filter housing outer diameter may increased without departing from the scope of this invention, as long as the filter housing is capable of movement within the valve stem passage 33 for engagement with the internal annular shoulder 35 of the valve stem 25.

In replacement of the annular groove 651 and openings 653 of the fifth embodiment, the filter housing 651 of this sixth embodiment has a pair of opposing flats 781 adjacent its upper end 624, and an opening 783 extending between the flats to provide fluid communication between the filter housing passage 653 and the valve stem passage 33. The upper end 624 of the filter housing 651 is generally flat, and includes the opening 665 through which the shaft 219 extends. The spring 421 seats loosely on the upper end 624 of the filter housing 651.

When the sealing device 213 of this sixth embodiment is moved to its open position, the shaft 219 of the sealing device moves downward in the valve stem passage 33 relative to the filter housing 651, with the lower end 223 of the shaft moving within the housing. The sealing element carrier 217 compresses the spring 421 between the carrier 217 and the upper end 624 of the housing 651 so that the bias of the spring urges the filter housing downward in the valve stem passage 33 to hold the housing stationary in abutment with the internal annular shoulder 35 of the valve stem 25. Fluid flowing out from the tire T flows into the filter housing passage 653 adjacent the lower end 626 of the housing 651 and is filtered through the filter element 71 disposed in the housing. The filtered fluid then flows up through the filter housing passage 653 and out of the housing 651 (and into the valve stem passage 33) through the opening 783 extending between the flats 781 adjacent the upper end 624 of the housing. The fluid then exits the valve stem 25 in a conventional manner. Fluid flowing down through the valve stem flows along a reverse path, e.g., into the filter housing 651 via the opening 783, down through the housing passage 653 and filter element 71 and into the tire T.

While the valve cores 27 of FIGS. 6–17, having an attached filter element 71, are shown and described for use in controlling fluid flow through the valve stem 25 of a pneumatic wheel assembly W, it is contemplated that these valve cores may be used in any number of other tubular casings having an interior surface defining a fluid passage without departing from the scope of this invention. For example, valve cores are used to control fluid flow through utility lines, automotive, residential and commercial air conditioning units, carbonated beverage machines, and other apparatus in which it is necessary to control fluid flow through a casing. The valve cores currently used in these apparatus may be replaced by the valve cores of the present invention with attached filter element. The passages defined by these apparatus are generally quite small, such that the valve core and filter element installed in these passages must be correspondingly small. For example, the filter elements shown in the embodiments of this invention are preferably in the range of 0.1–0.2 inches in diameter. However, by using the disclosed mesh size of the filter element, the rate of fluid flow through the passage is generally unaffected by installation of the filter element in the passage.

It will be observed from the foregoing that affixing or otherwise attaching the filter element 71 to the valve core 27 satisfies the various objectives of the present invention and offers other advantageous results. For example, because the filter element 71 is installable simultaneously with the valve core 27 as a single unit, the separate filter insertion steps of the method described above with respect to the filter insertion tool may be omitted. Accordingly, the filter passage 77 and filter loading assembly 61 of the tool may also be omitted, thus simplifying construction and operation of the tool. In addition, the valve core 27 and filter element 71 can be removed from the valve stem passage 33 and replaced without the additional cost and effort associated with replacing the valve stem 25.

Since the filter element 71 is retained on the valve core 27, the risk of dropping and losing the filter element 71 is reduced. Allowing for simultaneous removal of the filter element 71 and valve core 27 from the valve stem passage 33 also negates the need for a separate filter element removing tool. Moreover, because the filter element is secured in a stationary position by the components of the valve assembly, such as by the filter element 71 frictionally engaging the interior surface of the valve stem 25, or by the spring 421 urging the filter to a stationary position, no additional structure or mechanical device is required in the valve stem (or other tubular casing) for installing the filter element in the valve stem and maintaining the filter element in a fixed position in the passage 33, thus providing for easy installation of the valve core 27 and filter element in the passage.

In particular, the valve core 27 with attached filter element 71 of the first embodiment (FIGS. 6–9), in which the spring (not shown) of the valve core 27 is contained in the valve body 205 so that a spring seat and internal shoulder 35 for seating the spring seat are not required, can be installed into any passage in which control of the fluid flow through the passage is desired.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A sealing valve for controlling the flow of fluid through a passage defined by the interior surface of a tubular casing, the sealing valve having inner and outer ends and being adapted to be inserted, inner end first, in an inward direction into the passage of the tubular casing, said sealing valve comprising:

a valve body having a longitudinal axis and a longitudinal bore therethrough, said valve body being formed for releasable connection to the tubular casing when the valve body is inserted into the passage of the tubular casing to a position in which the longitudinal axis of the body is generally coaxial with the passage;

a valve seat on the valve body;

a sealing assembly comprising a sealing device adapted for sealing engagement with the valve seat, the sealing device being movable in an inward direction with respect to the valve seat from a closed sealing position in which the sealing device sealingly engages the valve seat to block fluid flow through the bore in the valve body to an open position in which the sealing device is spaced from the valve seat to permit fluid flow through the bore; and a filter element adjacent the inner end of the sealing valve configured for substantially preventing passage of particulate matter of a size capable of interfering with movement of the sealing device to its closed sealing position;

said valve body, sealing assembly and filter element being so constructed that they are held in assembly with one another independent of the tubular casing so that they can be simultaneously installed as a single unit in the tubular casing passage and simultaneously removed as a single unit from the tubular casing passage.

2. A sealing valve as set forth in claim 1 wherein said filter element is attached to the sealing device.

3. A sealing valve as set forth in claim 1 wherein said sealing device is movable relative to the filter element as the sealing device moves between its open and closed positions.

4. A sealing valve as set forth in claim 3 wherein the filter element has a filtering end portion adapted to extend across the passage, the filter element being sized and configured for engaging the casing so that substantially all of the fluid flowing through the passage passes through the filtering end portion of the filter element.

5. A sealing valve as set forth in claim 4 wherein said filter element is sufficiently flexible to conform to the interior surface of the tubular casing when the sealing valve is installed in the casing, but sufficiently stiff to remain in fixed position relative to the tubular casing as the sealing device moves between its open and closed positions.

6. A sealing valve as set forth in claim 5 wherein the filter element is configured to have the shape of a balloon surrounding at least a portion of the sealing device, said filter element having a body adapted for engagement with the interior surface of the tubular casing and a neck attached to the sealing device.

7. A sealing valve as set forth in claim 6 wherein said sealing device comprises a sealing element, a carrier carrying the sealing element, and a shaft extending inward from the carrier away from the valve seat, the sealing valve further comprising a filter assembly comprising the filter element and a band around the neck of the filter element for attaching the filter element to the shaft, said shaft having an enlarged end distal from the carrier for preventing the filter element from slipping off the distal end of the shaft.

8. A sealing valve as set forth in claim 7 further comprising an actuator pin extending outwardly from the sealing device through the longitudinal bore in the valve body, said actuator pin having an outer end adapted to be pushed inwardly relative to the valve body for moving the sealing device to its open position.

9. A sealing valve as set forth in claim 3 wherein the filter element has a generally cylindrical side wall and an end wall defining a filtering end portion of the filter element, said filter element being open at an end opposite the filtering end portion and generally surrounding at least a portion of the sealing device.

10. A sealing valve as set forth in claim 9 wherein said filter element is adapted for attachment to the sealing device generally at the open end of the filter element.

11. A sealing valve as set forth in claim 3 wherein the filter element is configured to have the general shape of a frustum and has a filtering end portion adapted to extend across the passage, the filter element being sized and configured for engaging the interior surface of the casing so that substantially all of the fluid flowing through the passage passes through the filtering end portion of the filter element, the filter element surrounding at least a portion of the sealing device.

12. A sealing valve as set forth in claim 11 wherein said filter element is adapted for attachment to the sealing device.

13. A sealing valve as set forth in claim 3 wherein the filter element has a mesh size of about 5–100 microns.

14. A sealing valve as set forth in claim 13 wherein the filter element mesh size is about 30–80 microns.

15. A sealing valve as set forth in claim 14 wherein the filter element mesh size is about 40–50 microns.

16. A sealing valve as set forth in claim 3 wherein the filter element has a maximum transverse diameter of about 0.1–0.2 inches.

17. In combination with a tubular casing having a passage therethrough defined by an interior surface of the casing, a sealing valve for controlling the flow of fluid through the passage, the sealing valve having inner and outer ends and being adapted to be inserted, inner end first, in an inward direction into the passage, said sealing valve comprising:

a valve body releasably secured in the passage of the tubular casing, said valve body having a longitudinal axis generally coaxial with said passage, and a longitudinal bore through the valve body;

a valve seat on the valve body;

a sealing assembly comprising a sealing device sealingly engageable with the valve seat, the sealing device being movable in an inward direction with respect to the valve seat from a closed sealing position in which the sealing mechanism sealingly engages the valve seat to block fluid flow through the bore in the valve body to an open position in which the sealing device is spaced from the valve seat to permit fluid flow through the bore; and a filter element adjacent the inner end of the sealing valve configured for substantially preventing passage of particulate matter of a size capable of interfering with movement of the sealing device to its closed sealing position;

said valve body, sealing assembly and filter element being so constructed that they are held in assembly with one another independent of the tubular casing so that they can be simultaneously installed as a single unit in the tubular casing passage and simultaneously removed as a single unit from the tubular casing.

18. A sealing valve as set forth in claim 17 wherein the filter element has a filtering end portion adapted to extend across the passage, the filter element being sized and configured for engaging the casing so that substantially all of the fluid flowing through the passage passes through the filtering end portion of the filter element.

19. A sealing valve for controlling the flow of fluid through a passage in a tubular casing having an internal shoulder, the sealing valve having inner and outer ends and being adapted to be inserted, inner end first, in an inward direction into the passage of the tubular casing, said sealing valve comprising:

a valve body having a longitudinal axis and a longitudinal bore therethrough, said valve body being formed for releasable connection to the tubular casing when the valve body is inserted into the passage of the tubular casing to a position in which the longitudinal axis of the body is generally coaxial with the passage;

a valve seat on the valve body;

a sealing assembly comprising a sealing device adapted for sealing engagement with the valve seat, the sealing device being movable in an inward direction with respect to the valve seat from a closed sealing position in which the sealing device sealingly engages the valve seat to block fluid flow through the bore in the valve body to an open position in which the sealing device is spaced from the valve seat to permit fluid flow through the bore; and a filter assembly adjacent the inner end of the sealing valve sized and configured for engaging the internal shoulder of the casing so that substantially all of the fluid flowing through the passage passes through the filter assembly, the filter assembly including a filter element configured for substantially preventing passage of particulate matter of a size capable of interfering with movement of the sealing device to its closed sealing position;

said valve body, sealing assembly and filter assembly being so constructed that they are held in assembly with one another independent of the tubular casing so that they can be simultaneously installed as a single unit in the tubular casing passage and simultaneously removed as a single unit from the tubular casing passage.

20. A sealing valve as set forth in claim 19 wherein the filter assembly comprises the filter element and a spring seat attached to the sealing device, the spring seat being adapted for securing the filter element between the spring seat and the internal shoulder of the casing when the sealing valve is installed in the passage to maintain the filter element in a stationary position in the passage as the sealing device moves between its open and closed position, the filter element having a filtering end portion sized and configured for engaging the internal shoulder of the passage so that substantially all of the fluid flowing through the passage passes through the filtering end portion of the filter element.

21. A sealing valve as set forth in claim 20 wherein the sealing device comprises a sealing element, a carrier carrying the sealing element and a shaft extending inward from the carrier away from the valve seat, the spring seat being connected to the shaft, the sealing valve further comprising a spring retained on the shaft between the carrier and the spring seat for biasing the sealing device toward its closed position and for biasing the spring seat inward toward the internal shoulder of the casing so that the spring seat and filter element remain stationary as the sealing device moves between its open and closed positions.

22. A sealing valve as set forth in claim 21 wherein the filter element of the filter assembly has a generally cylindrical side wall and an end wall defining a filtering end portion, said filter element being open at an end opposite the filtering end portion and generally surrounding at least a portion of the spring seat.

23. A sealing valve as set forth in claim 22 wherein the filter element fully encloses the spring seat and the filter assembly further comprises a band around the filter element for attaching the filter element to the shaft of the sealing device so that the spring seat prevents the filter element from slipping off the distal end of the shaft.

24. A sealing valve as set forth in claim 21 wherein the filter element is attached to the spring seat.

25. A sealing valve as set forth in claim 19 wherein the filter element has a filtering end portion adapted to extend across the passage, the filter element being sized and configured for engaging the casing so that substantially all of the fluid flowing through the passage passes through the filtering end portion of the filter element.

26. A sealing valve as set forth in claim 25 wherein the sealing device comprises a sealing element, a carrier carrying the sealing element and a shaft extending inward from the carrier away from the valve seat, the filter assembly comprising the filter element and a spring seat attached to the shaft, the spring seat being adapted for engagement with the internal shoulder of the casing, the sealing valve further comprising a spring retained on the shaft between the carrier and the spring seat, the filter element being clamped between the spring and the spring seat, said spring biasing the sealing device toward its closed position and biasing the spring seat inward toward the internal shoulder of the casing so that the spring seat and filter element remain stationary as the sealing device moves between its open and closed positions.

27. A sealing valve as set forth in claim 19 wherein the filter assembly comprises the filter element and a filter housing adapted for engagement with the internal shoulder of the tubular casing so that substantially all of the fluid flowing through the passage passes through the filter housing, the filter element being generally disposed in the filter housing.

28. A sealing valve as set forth in claim 27 wherein the filter housing is generally cylindrical and has a passage extending longitudinally therethrough, the filter housing having an opening communicating with the tubular casing passage for providing fluid communication between the filter housing passage and the tubular casing passage.

29. A sealing valve as set forth in claim 28 wherein at least a portion of the filter housing has an outer diameter substantially less than the diameter of the passage to define a gap between the filter housing and an interior surface of the casing defining the passage, the opening in the filter housing being spaced outward of the filter element and providing fluid communication between the filter housing passage and the gap to permit fluid flowing outward through the filter housing to flow out of the housing and into the valve stem passage.

30. A sealing valve as set forth in claim 28 wherein the filter housing has a pair of opposing external flats and an opening extending between the flats to provide fluid communication between the filter housing passage and the valve stem passage, the opening being spaced outward of the filter element.

31. A sealing valve as set forth in claim 19 wherein the sealing device is movable relative to the filter assembly as the sealing device moves between its open and closed positions.

32. A sealing valve as set forth in claim 31 further comprising spring means for retaining the filter assembly in engagement with the internal shoulder of the passage as the sealing device moves between its open and closed positions.

33. A sealing valve as set forth in claim 32 wherein the sealing device has a shaft extending inward of the passage away from the valve seat, the filter assembly comprising the filter element and a filter housing adapted for attachment to the shaft distal from the valve seat and for engagement with the internal shoulder of the tubular casing so that substantially all of the fluid flowing through the passage passes through the filter housing, the filter element being disposed in the filter housing.

34. A sealing valve as set forth in claim 33 wherein the sealing device further comprises a sealing element and a carrier carrying the sealing element, the shaft extending inward from the carrier away from the valve seat, said spring means comprising a spring on the shaft extending generally between the carrier and the filter housing for biasing the filter housing into engagement with the internal shoulder of the casing as the sealing device moves between its open and closed positions.

* * * * *